US011919304B2

(12) United States Patent
Toyofuku et al.

(10) Patent No.: US 11,919,304 B2
(45) Date of Patent: Mar. 5, 2024

(54) DRIVE-WAVEFORM DETERMINATION METHOD, NON-TRANSITORY COMPUTER-READABLE STORAGE MEDIUM STORING DRIVE-WAVEFORM DETERMINATION PROGRAM, LIQUID DISCHARGING APPARATUS, AND DRIVE-WAVEFORM DETERMINATION SYSTEM

(71) Applicant: SEIKO EPSON CORPORATION, Tokyo (JP)

(72) Inventors: Atsushi Toyofuku, Shiojiri (JP); Toshiro Murayama, Fujimi-machi (JP); Takahiro Katakura, Okaya (JP)

(73) Assignee: Seiko Epson Corporation, Tokyo (JP)

(*) Notice: Subject to any disclaimer, the term of this patent is extended or adjusted under 35 U.S.C. 154(b) by 157 days.

(21) Appl. No.: 17/445,873

(22) Filed: Aug. 25, 2021

(65) Prior Publication Data

US 2022/0063268 A1 Mar. 3, 2022

(30) Foreign Application Priority Data

Aug. 28, 2020 (JP) ................................ 2020-144791

(51) Int. Cl.
*B41J 29/38* (2006.01)
*B41J 2/045* (2006.01)

(52) U.S. Cl.
CPC ....... *B41J 2/04588* (2013.01); *B41J 2/04541* (2013.01); *B41J 2/04581* (2013.01); *B41J 2/04598* (2013.01)

(58) Field of Classification Search
CPC . B41J 2/04588; B41J 2/04581; B41J 2/04541
See application file for complete search history.

(56) References Cited

U.S. PATENT DOCUMENTS

2002/0054311 A1* 5/2002 Kubo .................. B41J 2/04588 358/1.13

FOREIGN PATENT DOCUMENTS

JP 2010-131910 A 6/2010

* cited by examiner

*Primary Examiner* — Lam S Nguyen
(74) *Attorney, Agent, or Firm* — WORKMAN NYDEGGER

(57) ABSTRACT

A drive-waveform determination method determines a waveform of a first drive pulse to be applied to a drive element included in a first liquid discharging head that discharges liquid. The drive-waveform determination method includes: a first step of obtaining second waveform information regarding a waveform of a second drive pulse to be applied to a drive element included in a second liquid discharging head that discharges liquid; and a second step of determining the waveform of the first drive pulse, based on the second waveform information.

20 Claims, 12 Drawing Sheets

DRIVE-WAVEFORM DETERMINATION METHOD, NON-TRANSITORY COMPUTER-READABLE STORAGE MEDIUM STORING DRIVE-WAVEFORM DETERMINATION PROGRAM, LIQUID DISCHARGING APPARATUS, AND DRIVE-WAVEFORM DETERMINATION SYSTEM

The present application is based on, and claims priority from JP Application Serial Number 2020-144791, filed Aug. 28, 2020, the disclosure of which is hereby incorporated by reference herein in its entirety.

BACKGROUND

1. Technical Field

The present disclosure relates to a drive-waveform determination method, a non-transitory computer-readable storage medium storing a drive-waveform determination program, a liquid discharging apparatus, and a drive-waveform determination system.

2. Related Art

In liquid discharging apparatuses, such as printers based on an ink-jet printing system, drive pulses are applied to drive elements, such as piezoelectric elements, so that liquid, such as ink, is discharged from heads. The waveform of each drive pulse is determined so that discharge characteristics of the ink from the head are desired characteristics.

In the technology disclosed in JP-A-2010-131910, parameters for determining a drive waveform, which is the waveform of a drive pulse, are varied a plurality of times to measure ejection characteristics, and parameters for a drive waveform to be actually used are determined based on the measurement result thereof.

In the technology disclosed in JP-A-2010-131910, when drive pulses are determined for respective heads, the above-described measurement needs to be performed for each head, and thus there is a problem that the number of processing steps needed for the determination increases considerably.

SUMMARY

According to one aspect of the present disclosure, there is provided a drive-waveform determination method for determining a waveform of a first drive pulse to be applied to a drive element included in a first liquid discharging head that discharges liquid. The drive-waveform determination method includes: a first step of obtaining second waveform information regarding a waveform of a second drive pulse to be applied to a drive element included in a second liquid discharging head that discharges liquid; and a second step of determining the waveform of the first drive pulse, based on the second waveform information.

According to one aspect of the present disclosure, there is provided a non-transitory computer-readable storage medium storing a drive-waveform determination program. The program causes a computer to execute the above-described drive-waveform determination method.

According to one aspect of the present disclosure, there is provided a liquid discharging apparatus including: a first liquid discharging head including a drive element for discharging liquid; and a processing circuit that performs processing for determining a waveform of a first drive pulse to be applied to the drive element included in the first liquid discharging head. The processing circuit executes: a first step of obtaining second waveform information regarding a waveform of a second drive pulse to be applied to a drive element included in a second liquid discharging head that discharges liquid; and a second step of determining the waveform of the first drive pulse, based on the second waveform information.

According to one aspect of the present disclosure, there is provided a drive-waveform determination system including: a first liquid discharging head including a drive element for discharging liquid; a second liquid discharging head including a drive element for discharging liquid; and a processing circuit that performs processing for determining a waveform of a first drive pulse to be applied to a drive element included in the first liquid discharging head. The processing circuit executes: a first step of obtaining second waveform information regarding a waveform of a second drive pulse to be applied to the drive element included in the second liquid discharging head; and a second step of determining the waveform of the first drive pulse, based on the second waveform information.

DESCRIPTION OF EXEMPLARY EMBODIMENTS

Figure 1:
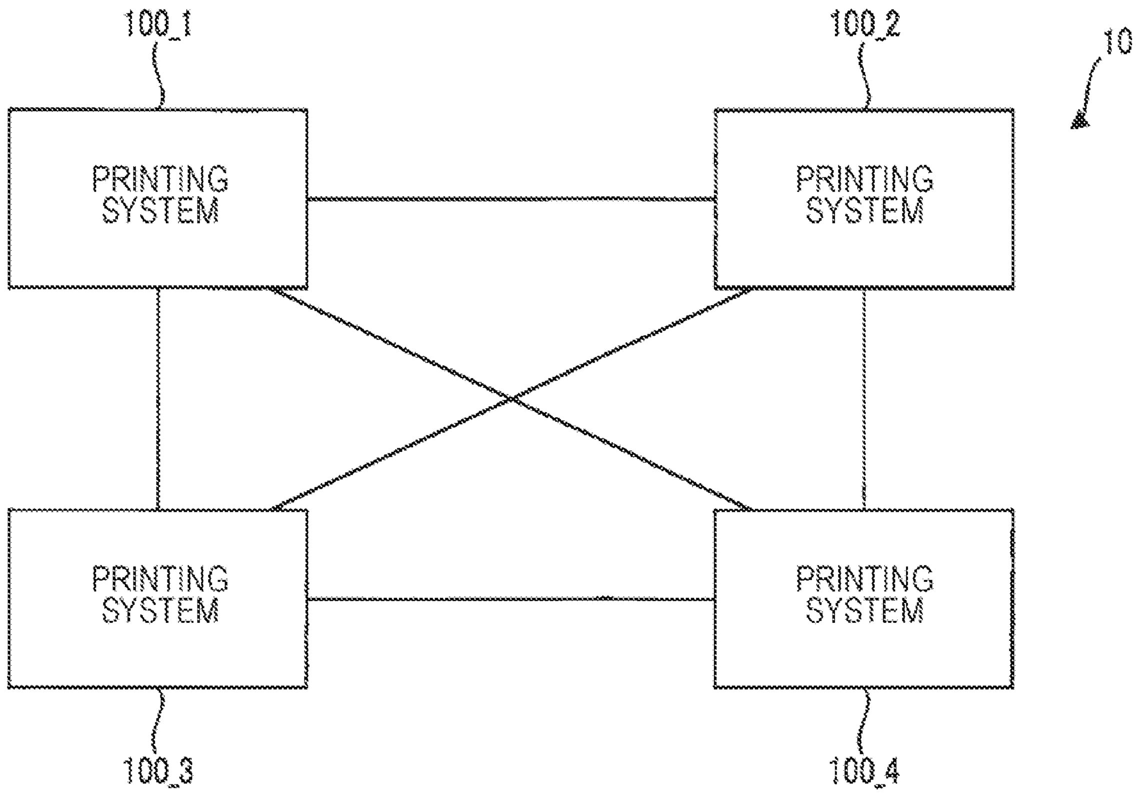
FIG. 1 is a schematic diagram illustrating a configuration example of a drive-waveform determination system according to a first embodiment.

Preferred embodiments according to the present disclosure will be described below with reference to the accompanying drawings. In the drawings, dimensions or scales of portions in the drawings differ from actual dimensions or scales, as appropriate, and some portions may be schematically illustrated for ease of understanding. The scope of the present disclosure is not limited to embodiments and modifications described below, unless otherwise so stated in the following description.

1. First Embodiment

1-1. Overview of Drive-Waveform Determination System 10

FIG. 1 is a schematic diagram illustrating a configuration example of a drive-waveform determination system 10 according to a first embodiment. The drive-waveform determination system 10 determines a waveform of a drive pulse, which is an electrical signal used during discharge of ink, which is one example of liquid. In the example illustrated in FIG. 1, the drive-waveform determination system 10 includes printing systems 100_1, 100_2, 100_3, and 100_4, each of which determines a waveform of a drive pulse. The printing systems 100_1, 100_2, 100_3, and 100_4 may hereinafter be referred to as "printing systems 100" without distinction therebetween.

The printing systems 100_1, 100_2, 100_3, and 100_4 can mutually share information needed to determine a waveform of a drive pulse. Thus, the number of processing steps needed to determine the waveform of the drive pulse can be reduced in each printing system 100. In the present embodiment, the printing systems 100 are connected through a peer-to-peer (P2P) system to be able to communicate with each other and share the information through communication between the printing systems 100.

1-2. Configuration Example of Printing Systems 100

Figure 2:
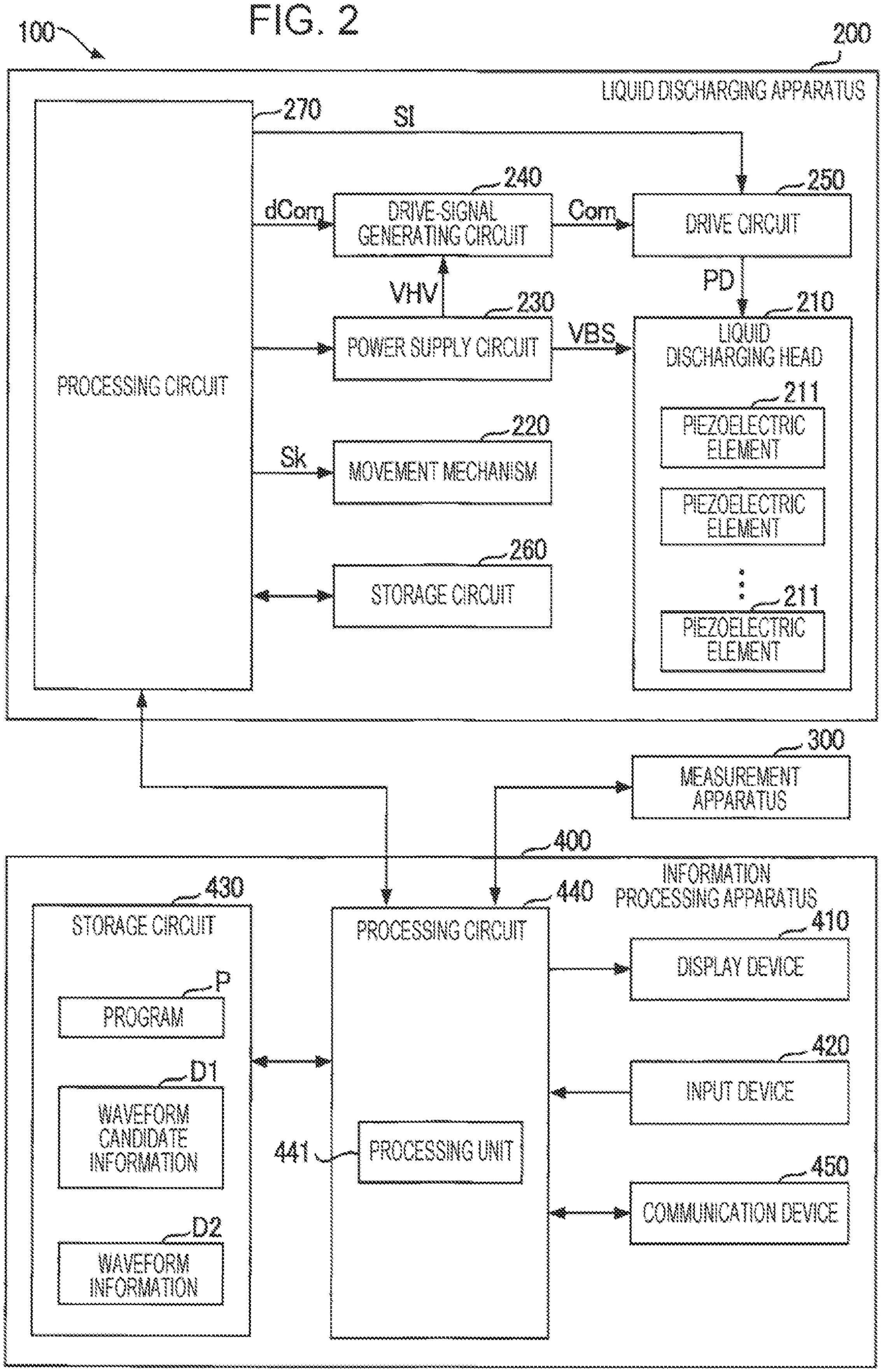
FIG. 2 is a schematic diagram illustrating a configuration example of one printing system used in the drive-waveform determination system according to the first embodiment.

FIG. 2 is a schematic diagram illustrating a configuration example of one printing system 100 used in the drive-waveform determination system 10 according to the first embodiment. The printing system 100 determines a waveform of a drive pulse PD by using waveform information D2, when the waveform information D2 can be obtained from another printing system 100. This waveform determination uses a result of measurement of discharge characteristics of ink, as appropriate, the measurement being performed by at least one of simulation and actual measurement, when a waveform candidate indicated by waveform candidate information D1 is used for the drive pulse PD. Also, the printing system 100 performs, when the waveform information D2 cannot be obtained from another printing system 100, at least one of the simulation and the actual measurement to measure the discharge characteristics of the ink when a waveform candidate indicated by the waveform candidate information D1 is used for the drive pulse PD without using the waveform information D2 and determines the waveform of the drive pulse PD based on the measurement result.

In any of the cases described above, in determination of the waveform of the drive pulse PD, when there is the waveform information D2 generated in the past by the printing system 100 that performs the determination, the waveform information D2 generated in the past may also be used. The waveform candidate information D1 and the waveform information D2 are described later.

As illustrated in FIG. 2, the printing system 100 includes a liquid discharging apparatus 200, a measurement apparatus 300, and an information processing apparatus 400, which is one example of a computer. These apparatuses will be described in sequence with reference to FIG. 2.

1-2a. Liquid Discharging Apparatus 200

The liquid discharging apparatus 200 is a printer that performs printing on a print medium by using an ink-jet printing system. The print medium may be any medium on which the liquid discharging apparatus 200 can perform printing. Examples of the print medium include various types of paper, various types of fabric, and various types of film. The liquid discharging apparatus 200 may be a serial printer or may be a line printer.

As illustrated in FIG. 2, the liquid discharging apparatus 200 includes a liquid discharging head 210, a movement mechanism 220, a power supply circuit 230, a drive-signal generating circuit 240, a drive circuit 250, a storage circuit 260, and a processing circuit 270.

The liquid discharging head 210 discharges ink to the print medium. In FIG. 2, a plurality of piezoelectric elements 211, which is one example of drive elements, is illustrated as constituent elements of the liquid discharging head 210. Although not illustrated, the liquid discharging head 210 has cavities in which the ink is contained and nozzles that communicate with the cavities, in addition to the piezoelectric elements 211. The piezoelectric elements 211 are provided for the cavities, respectively. By varying pressures in the cavities, the piezoelectric elements 211 cause the ink to be discharged from the nozzles corresponding to the cavities. Heaters that heat the ink in the cavities, instead of the piezoelectric elements 211, may be used as the drive elements.

Although the number of liquid discharging heads 210 included in the liquid discharging apparatus 200 is one in the example illustrated in FIG. 2, the number may be two or more. In such a case, for example, two or more liquid discharging heads 210 are integrated into a unit. When the liquid discharging apparatus 200 is a serial type, the liquid discharging apparatus 200 or a unit including two or more liquid discharging heads 210 is used such that the nozzles are distributed above part of the print medium in its width direction. Also, when the liquid discharging apparatus 200 is a line type, a unit including two or more liquid discharging heads 210 is used such that the nozzles are distributed above the entire area of the print medium in its width direction.

The movement mechanism 220 varies a relative position of the liquid discharging head 210 and the print medium. More specifically, when the liquid discharging apparatus 200 is a serial type, the movement mechanism 220 has a transporting mechanism that transports the print medium in a predetermined direction and a movement mechanism that causes the liquid discharging head 210 to move reciprocally along an axis that is orthogonal to the transport direction of the print medium. When the liquid discharging apparatus 200 is a line type, the movement mechanism 220 has a transporting mechanism that transports the print medium in a direction that crosses the longitudinal direction of the unit including two or more liquid discharging heads 210.

The power supply circuit 230 receives electric power supplied from a commercial power supply, not illustrated, to generate predetermined various potentials. The generated various potentials are supplied to the individual portions in the liquid discharging apparatus 200, as appropriate. For example, the power supply circuit 230 generates an offset potential VBS and a power-supply potential VHV. The offset potential VBS is supplied to the liquid discharging head 210 or the like. The power-supply potential VHV is also supplied to the drive-signal generating circuit 240 or the like.

The drive-signal generating circuit 240 is a circuit that generates a drive signal Com for driving each piezoelectric element 211 included in the liquid discharging head 210. Specifically, the drive-signal generating circuit 240 includes, for example, a digital-to-analog (DA) conversion circuit and an amplification circuit. In the drive-signal generating circuit 240, the DA conversion circuit converts a waveform designation signal dCom (described below), output from the processing circuit 270, from a digital signal to an analog signal, and the amplification circuit uses the power-supply potential VHV from the power supply circuit 230 to amplify the analog signal to thereby generate the drive signal Com. A signal having a waveform that is included in waveforms included in the drive signal Com and that is actually supplied to the piezoelectric elements 211 is the drive pulse PD. The drive pulse PD is described later.

Based on a control signal SI described below, the drive circuit 250 switches whether or not at least one of the waveforms included in the drive signal Com is to be supplied to each of the piezoelectric elements 211 as the drive pulse PD. The drive circuit 250 is an integrated circuit (IC) chip that outputs a drive signal for driving each piezoelectric element 211 and a reference voltage.

The storage circuit 260 stores therein various programs to be executed by the processing circuit 270 and various types of data, such as print data processed by the processing circuit 270. The storage circuit 260 includes, for example, one semiconductor memory that is one of a volatile memory and a nonvolatile memory or semiconductor memories constituted by both thereof. The volatile memory is, for example, a random-access memory (RAM), and the nonvolatile memory is, for example, a read-only memory (ROM), an electrically erasable programmable read-only memory (EEPROM), or a programmable ROM (PROM). The print data is supplied from, for example, the information processing apparatus 400. The storage circuit 260 may be implemented as a portion of the processing circuit 270.

The processing circuit 270 has a function for controlling operations of the individual portions in the liquid discharging apparatus 200 and a function for processing various types of data. The processing circuit 270 includes, for example, one or more processors, such as central processing units (CPUs). The processing circuit 270 may include a programmable logic device, such as field programmable gate array (FPGA), in place of or in addition to the CPU(s).

The processing circuit 270 controls operations of the individual portions in the liquid discharging apparatus 200 by executing a program stored in the storage circuit 260. The processing circuit 270 generates signals, such as the control signal SI, a control signal Sk, and the waveform designation signal dCom, as signals for controlling operations of the individual portions in the liquid discharging apparatus 200.

The control signal Sk is a signal for controlling drive of the movement mechanism 220. The control signal SI is a signal for controlling drive of the drive circuit 250. Specifically, the control signal SI designates whether or not the drive circuit 250 supplies the drive signal Com, output from the drive-signal generating circuit 240, to the liquid discharging head 210 as the drive pulse PD every predetermined unit period. This designation designates, for example, the amount of ink to be discharged from the liquid discharging head 210. The waveform designation signal dCom is a digital signal for specifying a waveform of the drive signal Com to be generated by the drive-signal generating circuit 240.

1-2b. Measurement Apparatus 300

The measurement apparatus 300 is an apparatus for measuring discharge characteristics of ink from the liquid discharging head 210 when the drive pulse PD is actually used. Examples of the discharge characteristics include a discharge speed, the amount of the ink, the number of satellites, and stability. The discharge characteristics of the ink from the liquid discharging head 210 may hereinafter be referred to simply as "discharge characteristics".

The measurement apparatus 300 in the present embodiment is an imaging apparatus that images a flying state of the ink discharged from the liquid discharging head 210. Specifically, the measurement apparatus 300 includes, for example, an imaging optical system and an imaging element. The imaging optical system is an optical system including at least one imaging lens. The imaging optical system may include various optical elements, such as a prism, and may include a zoom lens, a focus lens, or the like. Examples of the imaging element include a charge-coupled device (CCD) image sensor and a complementary metal-oxide semiconductor (CMOS) image sensor. The discharge characteristic measurement using images acquired by the measurement apparatus 300 is described later.

Although, in the present embodiment, the measurement apparatus 300 images flying ink, it is also possible to measure a discharge characteristic, such as the amount of ink discharged from the liquid discharging head 210, based on a result of imaging the ink that has landed on the print medium or the like. Also, it is sufficient that the measurement apparatus 300 be able to obtain a measurement result corresponding to a discharge characteristic of ink from the liquid discharging head 210, and the measurement apparatus 300 is not limited to an imaging device. For example, the measurement apparatus may also be an electronic balance for measuring the mass of ink discharged from the liquid discharging head 210. In addition, a result of detection of the waveform of residual vibration that occurs at the liquid discharging head 210, other than information from the measurement apparatus 300, may be used as an information source for measuring a discharge characteristic of ink from the liquid discharging head 210. The residual vibration is vibration that remains in an ink flow passage in the liquid discharging head 210 after the piezoelectric elements 211 are driven. The residual vibration is detected, for example, as voltage signals from the piezoelectric elements 211.

1-2c. Information Processing Apparatus 400

The information processing apparatus 400 is a computer for controlling operations of the liquid discharging apparatus 200 and the measurement apparatus 300. The information processing apparatus 400 is connected to each of the liquid discharging apparatus 200 and the measurement apparatus 300 by wire or wirelessly to be able to mutually communicate therewith. In this connection, a communication network including the Internet may be involved.

The information processing apparatus 400 in the present embodiment is one example of a computer that executes a program P, which is one example of a drive-waveform determination program. The program P causes the information processing apparatus 400 to execute a drive-waveform determination method for determining the waveform of the drive pulse PD to be applied to the piezoelectric elements 211 provided in the liquid discharging head 210 that discharges ink, which is one example of liquid.

As illustrated in FIG. 2, the information processing apparatus 400 includes a display device 410, an input device 420, a storage circuit 430, a processing circuit 440, and a communication device 450. These devices and circuits are connected to be able to communicate with each other.

Under the control of the processing circuit 440, the display device 410 displays various images. The display device 410 has, for example, a display panel, such as a liquid-crystal display panel or an organic electro-luminescence (EL) display panel. The display device 410 may be provided external to the information processing apparatus 400. The display device 410 may also be a constituent element of the liquid discharging apparatus 200.

The input device 420 is equipment that receives an operation from a user. For example, the input device 420 has a touchpad, a touch panel, or a pointing device, such as a mouse. When the input device 420 has a touch panel, it may also serve as the display device 410. The input device 420 may be provided external to the information processing apparatus 400. The input device 420 may also be a constituent element of the liquid discharging apparatus 200.

The communication device 450 is an interface that is connected to another printing system 100 to be able to communicate therewith. For example, the communication device 450 is a wireless or wired local area network (LAN) interface, a Universal Serial Bus (USB) interface, a High-Definition Multimedia Interface (HDMI), or the like. USB and HDMI are registered trademarks. The communication device 450 may be connected to another printing system 100 through another network, such as the Internet. Also, the communication device 450 may be regarded as a portion of a processing unit 441, which is described below, or may be integral with the processing circuit 440.

The storage circuit 430 is a device that stores therein various programs to be executed by the processing circuit 440 and various types of data processed by the processing circuit 440. The storage circuit 430 has, for example, a hard-disk drive or a semiconductor memory. The storage circuit 430 may be partly or entirely provided, for example, in a storage device or server external to the information processing apparatus 400.

The storage circuit 430 in the present embodiment stores therein the program P, the waveform candidate information D1, and the waveform information D2. Part or all of the program P, the waveform candidate information D1, and the waveform information D2 may be stored, for example, in a storage device or server external to the information processing apparatus 400.

The waveform candidate information D1 is information indicating one or more waveform candidates of the drive pulse PD. Although a detailed description is given later, the waveform candidate information D1 is set according to an input from the user or is automatically generated upon execution of the program P. In the present embodiment, an algorithm or the like for evaluating a measurement result obtained by simulation or actual measurement described below is used to adjust the waveform candidate information D1 so as to achieve a desired waveform. As a result, a waveform based on final waveform candidate information D1 is obtained as the waveform of the waveform drive pulse PD.

The waveform information D2 is information regarding a waveform of the drive pulse PD. The waveform information D2 includes, for example, information indicating a waveform of the drive pulse PD, information indicating waveform candidates of the drive pulse PD, or information indicating waveform non-candidates, which are not the waveform candidates of the drive pulse PD. As described above, the waveform information D2 is obtained from another printing system 100 that is different from the printing system 100 that determines the waveform of the drive pulse PD. When the waveform of the drive pulse PD is determined, the waveform information D2 is newly generated upon the determination. The generated waveform information D2 may be stored in the storage circuit 430 separately from the waveform information D2 obtained from the different printing system 100 or may replace the waveform information stored in the storage circuit 430. The waveform information D2 may include, in addition to the above-described information, for example, information regarding a measurement condition used to determine the waveform of the drive pulse PD. For example, the waveform information D2 may include information used by another printing system 100. Examples of the information include image data indicating a photography result of liquid or dots, residual vibration data indicating a result of residual vibration when the liquid is discharged, and information indicating a discharge characteristic, such as the amount of ink or a discharge speed, that is measured as described below.

The processing circuit 440 is a device having a function for controlling the individual portions in the information processing apparatus 400, a function for controlling the liquid discharging apparatus 200 and the measurement apparatus 300, and a function for processing various types of data. The processing circuit 440 includes, for example, a processor, such as a CPU. The processing circuit 440 may be constituted by a single processor or a plurality of processors. Some or all of the functions of the processing circuit 440 may be implemented by hardware, such as a digital signal processor (DSP), an application-specific integrated circuit (ASIC), a programmable logic device (PLD), or a field programmable gate array (FPGA).

The processing circuit 440 functions as the processing unit 441 by reading the program P from the storage circuit 430 and executing the read program P.

When the waveform information D2 is obtained, the processing unit 441 determines the waveform of the drive pulse PD by using the waveform candidate information D1 and the waveform information D2. The processing unit 441 determines the waveform of the drive pulse PD, as needed, by using a result of measurement of the discharge characteristics of the ink from the liquid discharging head 210 when one or more waveform candidates indicated by the waveform candidate information D1 are used for the drive pulse PD, the measurement being performed by the simulation or the actual measurement. When the printing system 100 fails to obtain the waveform information D2, the processing unit 441 determines the waveform of the drive pulse PD by using at least one of the simulation and the actual measurement.

The simulation is realized by, for example, a program module that performs arithmetic operation for generating discharge characteristics based on the waveform of the drive pulse PD. Coefficients set using theoretical values, an experiment, or the like are applied to an equation for the arithmetic operation. In the arithmetic operation, for example, when parameters (described below) indicating a waveform of the drive pulse PD are input as input values, a numerical value indicating a discharge characteristic, such as an ink speed or the amount of ink, is generated as an output value. A detailed description of the actual measurement is given in "1-4. Actual Measurement of Discharge Characteristics of Ink" described below.

1-3. Waveform Example of Drive Pulse PD

Figure 3:
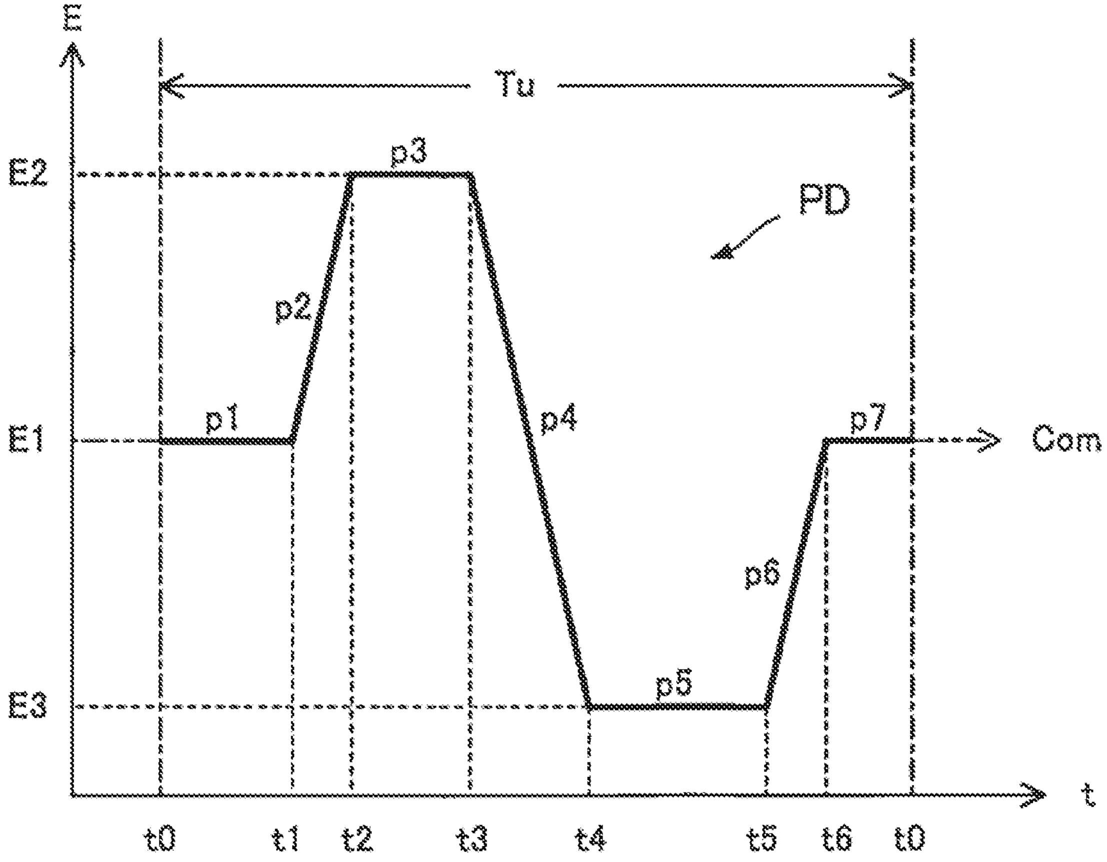
FIG. 3 is a graph illustrating one example of the waveform of a drive pulse.

FIG. 3 is a graph illustrating one example of the waveform of the drive pulse PD. FIG. 3 illustrates changes in the potential of the drive pulse PD over time, that is, the voltage waveform of the drive pulse PD. The waveform of the drive pulse PD is not limited to the example illustrated in FIG. 3 and is arbitrary.

As illustrated in FIG. 3, the drive pulse PD is included in the drive signal Com every unit period Tu. In the example illustrated in FIG. 3, a potential E of the drive pulse PD increases from a potential E1, which is a reference, to a potential E2, decreases to a potential E3, which is lower than the potential E1, and then returns to the potential E1.

More specifically, the potential E of the drive pulse PD is first maintained at the potential E1 throughout a period from timing t0 to timing t1 and then increases to the potential E2 throughout a period from timing t1 to timing t2. Then, the potential E of the drive pulse PD is maintained at the potential E2 throughout a period from timing t2 to timing t3 and then decreases to the potential E3 throughout a period from timing t3 to timing t4. Thereafter, the potential E of the drive pulse PD is maintained at the potential E3 throughout a period from timing t4 to timing t5 and then increases to the potential E1 throughout a period from timing t5 to timing t6.

The drive pulse PD having such a waveform causes the inner volume of a pressure chamber in the liquid discharging head 210 to increase in the period from timing t1 to timing t2 and causes the inner volume of the pressure chamber to decrease rapidly in the period from timing t3 to timing t4. As a result of such changes in the inner volume of the pressure chamber, part of the ink in the pressure chamber is discharged from the nozzles as droplets.

The waveform of the drive pulse PD as described above can be represented by a function using parameters p1, p2, p3, p4, p5, p6, and p7 corresponding to the above-described periods. When the waveform of the drive pulse PD is defined by the function, varying the parameters makes it possible to adjust the waveform of the drive pulse PD. Adjusting the waveform of the drive pulse PD makes it possible to adjust the discharge characteristics of the ink from the liquid discharging head 210.

1-4. Actual Measurement of Discharge Characteristics of Ink

The information processing apparatus 400 described above drives the liquid discharging head 210 by actually using the drive pulse PD, and measures the discharge characteristics of the ink from the liquid discharging head 210, based on image information from the measurement apparatus 300.

Figure 4:
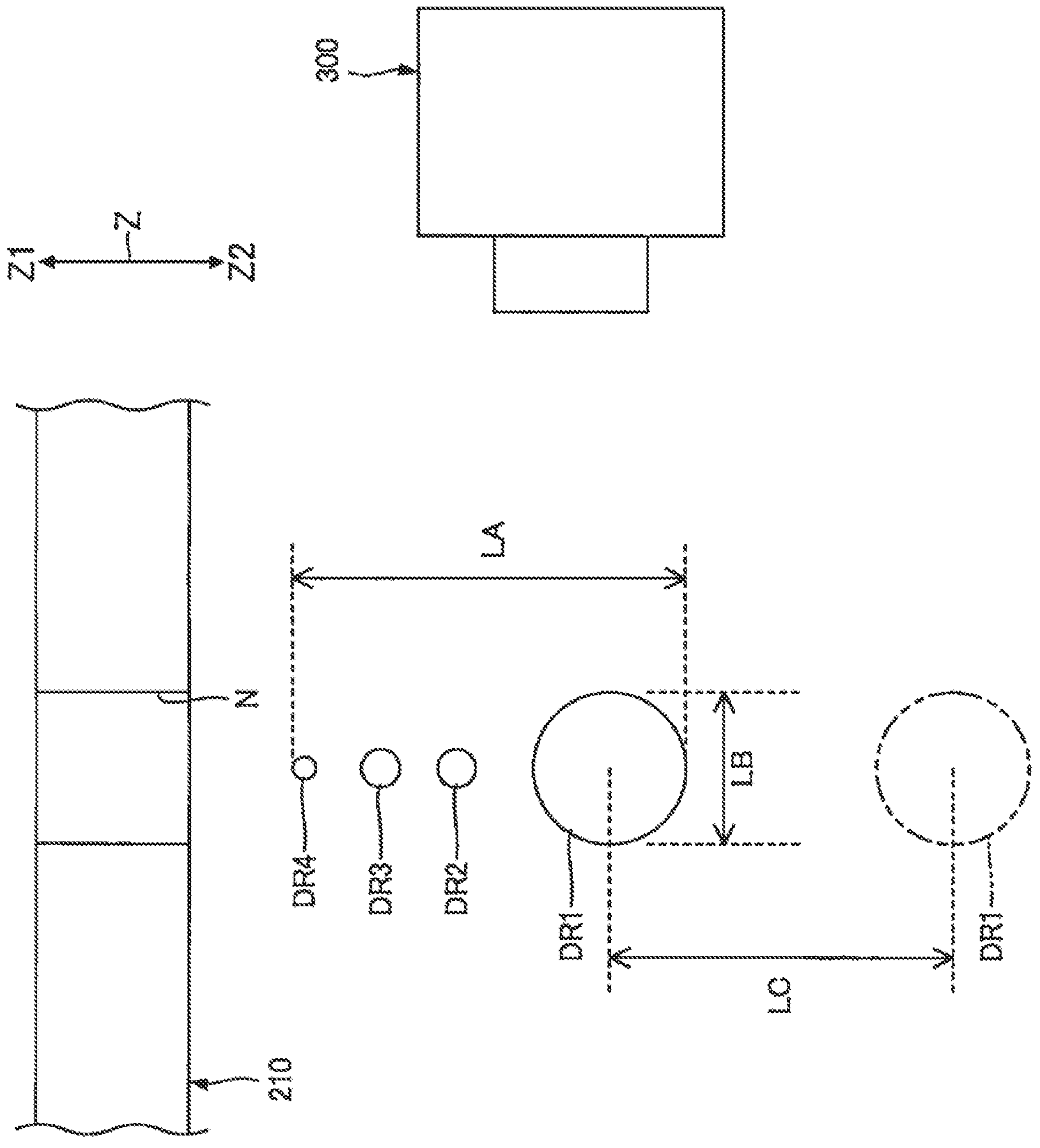
FIG. 4 is a diagram for describing actual measurement of discharge characteristics of ink.

FIG. 4 is a diagram for describing actual measurement of the discharge characteristics of the ink. As illustrated in FIG. 4, the measurement apparatus 300 in the present embodiment images, from a direction that is orthogonal to or crosses an ink discharge direction, flying states of droplets DR1, DR2, DR3, and DR4 discharged from a nozzle N in the liquid discharging head 210.

The droplet DR1 is a main droplet. The droplets DR2, DR3, and DR4 are called satellites, which have smaller diameters than that of the droplet DR1, and occur subsequent to the droplet DR1 upon occurrence of the droplet DR1. Whether or not the droplets DR2, DR3, and DR4 occur, the number of droplets DR2, DR3, and DR4, the sizes thereof, and so on differ depending on the waveform of the drive pulse PD.

The amount of the ink discharged from the liquid discharging head 210 is calculated, for example, based on a diameter LB of the droplet DR1 by using an image acquired by the measurement apparatus 300. The speed of the ink discharged from the liquid discharging head 210 is calculated, for example, by continuously imaging the droplet DR1 and based on a movement distance LC of the droplet DR1 after a predetermined amount of time passes and the predetermined amount of time. In FIG. 4, the droplet DR1 after the predetermined time passes is denoted by a chain double-dashed line. An aspect ratio (LA/LB) of the ink from the liquid discharging head 210 may also be calculated as a discharge characteristic of the ink.

1-5. Flow of Waveform Determination of Drive Pulse PD

Figure 5:
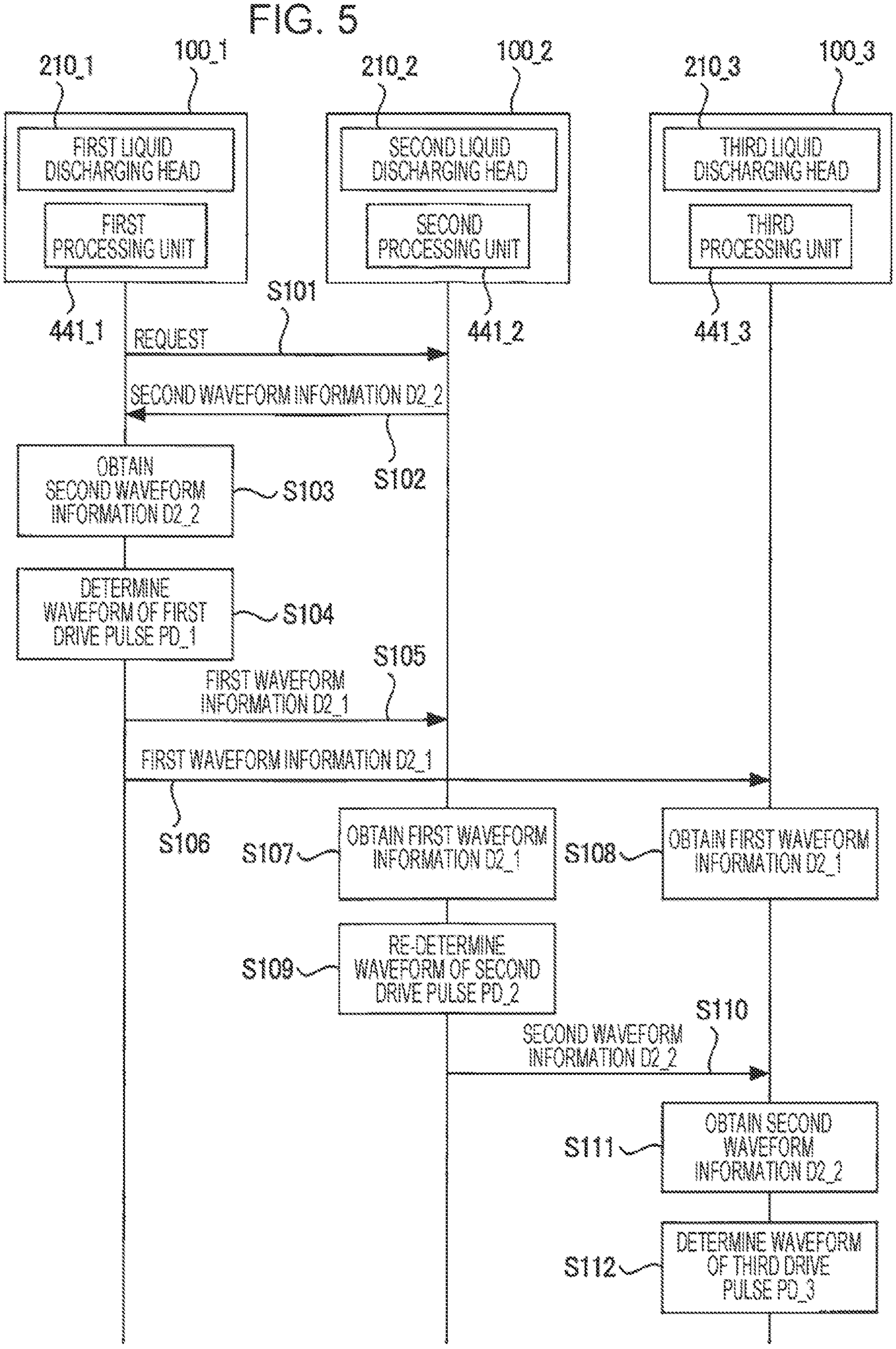
FIG. 5 is a flowchart illustrating a drive-waveform determination method according to the first embodiment.

FIG. 5 is a flowchart illustrating the drive-waveform determination method according to the first embodiment. FIG. 5 illustrates flows of processes in the printing systems 100_1, 100_2, and 100_3 when the printing system 100_1 mainly determines the waveform of the drive pulse PD. Although the printing system 100_4 is not illustrated in FIG. 5, processes in the printing system 100_4 are substantially the same as, for example, the processes in the printing system 100_1, 100_2, or 100_3.

The printing system 100_1 includes a first liquid discharging head 210_1, which is the liquid discharging head 210, and a first processing unit 441_1, which is the processing unit 441. Similarly, the printing system 100_2 includes a second liquid discharging head 210_2, which is the liquid discharging head 210, and a second processing unit 441_2, which is the processing unit 441. The printing system 100_3 also includes a third liquid discharging head 210_3, which is the liquid discharging head 210, and a third processing unit 441_3, which is the processing unit 441.

A case in which the printing system 100_2 has second waveform information D2_2, which is generated as the waveform information D2 upon determining the waveform of the drive pulse PD in advance, will be described by way of example. Although a detailed description is not given, when the printing system 100_2 does not have the second waveform information D2_2, the printing system 100_1 determines the waveform of the drive pulse PD by using waveform information D2 of another printing system or without using the waveform information D2.

When the printing system 100_1 receives an instruction for determining the waveform of the drive pulse PD from the user or the like, first, the first processing unit 441_1 issues a request for the waveform information D2 to the printing system 100_2 in step S101, as illustrated in FIG. 5.

Next, in step S102, the second processing unit 441_2 transmits the second waveform information D2_2 to the printing system 100_1 as the waveform information D2. This transmission is performed via the communication device 450 in the printing system 100_2. Step S102 is one example of a "fifth step".

Thereafter, in step S103, the first processing unit 441_1 obtains the second waveform information D2_2. This obtaining is performed via the communication device 450 in the printing system 100_1. After the obtaining, the first processing unit 441_1 causes the second waveform information D2_2 to be stored in the storage circuit 430 in the printing system 100_1. Step S103 is one example of a "first step".

Next, in step S104, based on the second waveform information D2_2, the first processing unit 441_1 determines a waveform of a first drive pulse PD_1, which is the drive pulse PD used in the printing system 100_1. An example of a specific process in step S104 is given later with reference to FIG. 6. Step S104 is one example of a "second step".

At this point in time, the first processing unit 441_1 generates first waveform information D2_1 as the waveform information D2 regarding the waveform of the first drive pulse PD_1. After the generation, the first processing unit 441_1 causes the first waveform information D2_1 to be stored in the storage circuit 430 in the printing system 100_1.

Thereafter, in step S105, the first processing unit 441_1 transmits the first waveform information D2_1 to the printing system 100_2. Also, in step S106, the first processing unit 441_1 transmits the first waveform information D2_1 to the printing system 100_3. Those transmissions are performed via the communication device 450 in the printing system 100_1. Those transmissions may be performed when a request is received from the printing system 100_2 or 100_3 to which the first waveform information D2_1 is to be transmitted.

In step S107, in the printing system 100_2, the second processing unit 441_2 obtains the first waveform information D2_1. Thereafter, in step S109, based on the first waveform information D2_1, the second processing unit 441_2 re-determines a waveform of a second drive pulse PD_2, which is the drive pulse PD used in the printing system 100_2. This re-determination is made as in step S104 described above. This re-determination may be made, for example, when an instruction is received from the user.

The second processing unit 441_2 updates the second waveform information D2_2 stored in the storage circuit 430 in the printing system 100_2. Thereafter, in step S110, the second processing unit 441_2 transmits the second waveform information D2_2 to the printing system 100_3. This transmission is performed via the communication device 450 in the printing system 100_2. This transmission may also be performed when a request is received from the printing system 100_3 to which the second waveform information D2_2 is to be transmitted.

In step S108, the third processing unit 441_3 in the printing system 100_3 obtains the first waveform information D2_1. Also, in step S111, the third processing unit 441_3 obtains the second waveform information D2_2. Thereafter, in step S112, based on the first waveform information D2_1 and the second waveform information D2_2, the third processing unit 441_3 determines a waveform of a third drive pulse PD_3, which is the drive pulse PD used in the printing system 100_3. This determination is made as in step S104. This determination may also be made, for example, when an instruction is received from the user. The second waveform information D2_2 used for the determination may be the second waveform information D2_2 before the above-described re-determination is made. Step S112 is one example of an "eighth step".

1-5a. Example of Specific Process in Step S104

Figure 6:
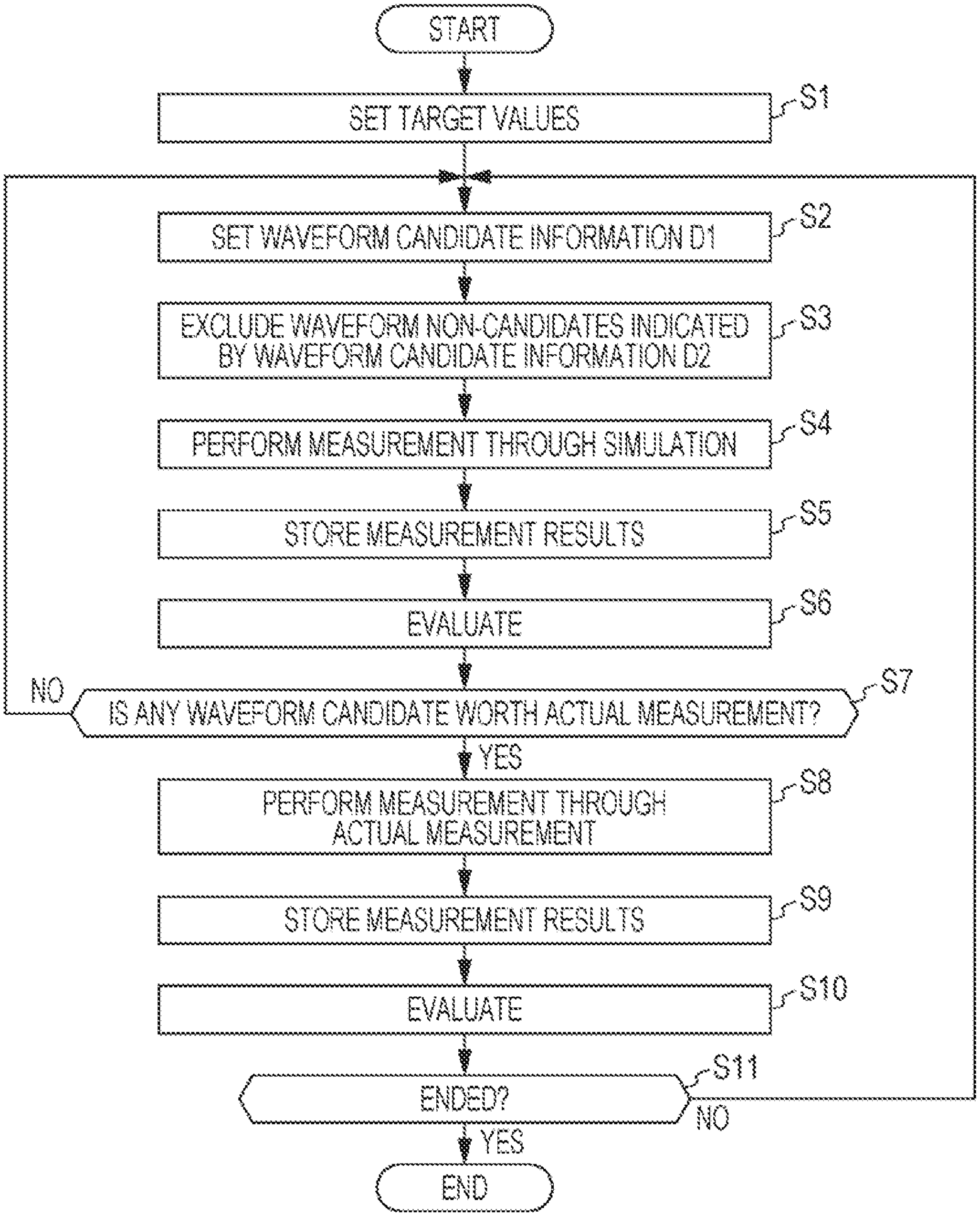
FIG. 6 is a flowchart illustrating one example of processing for automatically determining the waveform of the drive pulse.

FIG. 6 is a flowchart illustrating one example of processing for automatically determining the waveform of the drive pulse PD. FIG. 6 illustrates one example of the process in step S104 described above and illustrated in FIG. 5. In step S104 described above, first, the processing unit 441 sets target values or the like of intended discharge characteristics, for example, in accordance with an input from the user in step S1, as illustrated in FIG. 6.

In step S2, the processing unit 441 sets the waveform candidate information D1, based on the target values or an evaluation value, which is described below.

In step S2, when there is no evaluation value or no waveform candidate information D1 based on an evaluation value, the waveform candidate information D1 based on the target values is set, and on the other hand, when there is an evaluation value or the waveform candidate information D1 based on an evaluation value, the waveform candidate information D1 based on the evaluation value is set. The waveform candidate information D1 may be set using another method or may be, for example, randomly generated.

Next, in step S3, the processing unit 441 excludes each waveform candidate that is included in one or more waveform candidates indicated by the waveform candidate information D1 and that corresponds to any of waveform non-candidates indicated by the waveform information D2. Although not illustrated in FIG. 6, when one or more waveform candidates indicated by the waveform candidate information D1 all correspond to the waveform non-candidates indicated by the waveform information D2, the process does not proceed to step S4, and the process in steps S2 is executed again.

Thereafter, in step S4, with respect to one or more waveform candidates indicated by the waveform candidate information D1, the processing unit 441 measures the discharge characteristics of ink through simulation. In step S5, the processing unit 441 causes the measurement results to be stored in the storage circuit 430. Thereafter, in step S6, the processing unit 441 evaluates the measurement results.

In the evaluation, for example, an evaluation function that exhibits a minimum or maximum value when predetermined discharge characteristics have corresponding desired values or fall in corresponding desired ranges is used, and a result of the evaluation is represented as an evaluation value, which is a calculated value of the evaluation function. A linear sum of terms regarding the predetermined discharge characteristics may be used as one example of the evaluation function. A linear sum of a term regarding the discharge speed and a term regarding the amount of ink may be used as one example of the evaluation function in the present embodiment. Parameters of the evaluation function are the aforementioned parameters p1, p2, p3, . . . regarding the waveform of the drive pulse PD.

More specifically, one example of an evaluation function f(x) is represented by:

$$f(x)=W1\times(Vm(x)-Vm\mathrm{Target})^2+W2\times(Iw(x)-Iw\mathrm{Target})^2.$$

The evaluation function does not necessarily have to be a linear sum, and any function with which the discharge characteristics have corresponding desired values or fall in corresponding desired ranges can be used as the evaluation function.

In this case, in the evaluation function f(x), x represents the parameters p1, p2, p3, . . . Vm(x) represents a measurement value of the discharge speed through the simulation. Iw(x) represents a measurement value of the amount of ink through the simulation. VmTarget is a target value of the discharge speed. IwTarget is a target value of the amount of ink. W1 and W2 are weighting factors. Although, in the example of the evaluation function f(x), the evaluation is performed using the amount of ink and the discharge speed, the evaluation may also be performed using discharge stability, an incline in the discharge direction, or the like.

Based on the evaluation value of the evaluation function, the waveform candidate information D1 is adjusted so that the measurement results approach the corresponding target discharge characteristics. This adjustment is actually reflected in the waveform candidate information D1 when it is determined in step S7 described below that the process is to return to S2.

The adjustment of the waveform candidate information D1 uses, for example, an optimization algorithm, such as for Bayesian optimization or the Nelder-Mead method, that is based on the measured discharge characteristics and with which the evaluation value of the evaluation function is minimized.

When Bayesian optimization is used to adjust the waveform candidate information D1, an acquisition function based on expected improvement (EI), probability of improvement (PI), upper confidence bound (UCB), lower confidence bound (LCB), predictive entropy search (PES), or the like is used to search for the parameters p1, p2, p3, . . . to thereby determine post-adjustment waveform candidate information D1.

Features of each waveform candidate indicated by the waveform candidate information D1 that is obtained differ depending on the type of acquisition function that is used. Waveform candidates obtained using an acquisition function EI generally tend to be waveforms with which expectation for the amount of improvement is high. Waveform candidates obtained using an acquisition function PI are waveforms having a high probability of improvement and having a small amount of improvement. Waveform candidates obtained using an acquisition function UCB are waveforms having large room for improvement and also having large room for deterioration.

Since the Nelder-Mead method is a local optimization algorithm, it is preferable in a case in which parameters of the ink or the target discharge characteristics are slightly varied using an existing waveform of the drive pulse PD. In step S7, the processing unit 441 determines whether or not any of the one or more waveform candidates indicated by the waveform candidate information D1 is worth measurement through actual measurement of the discharge characteristics of ink, based on a criterion described below. When there is no waveform candidate that is worth the actual measurement, the process returns to step S2 described above. That is, the processing unit 441 repeats steps S2 to S7 described above, until there is a waveform candidate that is worth the actual measurement.

The determination in step S7 is made based on a criterion that whether the ink can be normally discharged with no air bubbles or the like being introduced, a criterion that whether no discharge failure occurs subsequently, and a criterion that whether a waveform candidate in question is worth the actual measurement. Although a method for determining whether or not a waveform candidate in question is worth the actual measurement is arbitrary, for example, more specific examples include a determination method described below.

For example, when the amount of ink indicated by a measurement result obtained through simulation is smaller than a predetermined threshold, it can be presumed that the discharge is not normally performed, and thus it is determined that the waveform candidate in question is not yet worth the actual measurement. On the other hand, when the amount of ink is larger than or equal to the predetermined threshold, it is determined that the waveform candidate in question is worth the actual measurement.

Also, for example, the range of waveforms with which a discharge failure is likely to occur or the range of waveforms that are unpractical due to a constraint based on the lifetime of hardware, safety, and so on is pre-determined by inequalities of the aforementioned parameters or the like, and when a waveform candidate falls in the range, this waveform candidate is presumed to be inadequate without having to perform the actual measurement, and it is thus determined that this waveform candidate is not yet worth the actual measurement. On the other hand, when the waveform candidate does not fall in the range, it is determined that the waveform candidate is worth the actual measurement.

Also, for example, when the difference between one discharge characteristic obtained as a measurement result through the simulation and the corresponding target value is larger than or equal to a predetermined value, it is presumed that an improvement can be performed through the simulation, and it is thus determined that the waveform candidate is not yet worth the actual measurement. On the other hand, when the difference between one discharge characteristic and the corresponding target value is smaller than the predetermined value, it is determined that the waveform candidate is worth the actual measurement.

Also, for example, the amount of information obtained through the simulation and the amount of information obtained through the actual measurement are evaluated, and when the amount of information obtained through the actual measurement is a predetermined amount or more smaller than the amount of information obtained through the simulation, it is presumed that an improvement can be performed through the simulation, and it is thus determined that the waveform candidate is not yet worth the actual measurement. On the other hand, when the amount of information obtained through the actual measurement is not the predetermined amount or more smaller than the amount of information obtained through the simulation, it is determined that the waveform candidate is worth the actual measurement. Those amounts of information correspond to, for example, information entropy.

When it is determined that the waveform candidate is worth the actual measurement, the processing unit 441 executes measurement through the actual measurement of the discharge characteristics of the ink in step S8. That is, when the ink can be normally discharged, no subsequent discharge failure occurs, and the waveform candidate is worth the actual measurement, the processing unit 441 executes measurement through the actual measurement of the discharge characteristics of the ink.

In step S9, the processing unit 441 causes the measurement results to be stored in the storage circuit 430. Thereafter, in step S10, the processing unit 441 uses the measurement results to calculate an evaluation value of an evaluation function.

The evaluation in step S10 uses an evaluation function f(x) that is the same as the function used in the evaluation in step S6 described above. In step S10, however, Vm(x) is a measurement value of the discharge speed which is obtained by the actual measurement, and Iw(x) is a measurement value of the amount of the ink which is obtained by the actual measurement. Based on the evaluation value of the evaluation function, the waveform candidate information D1 is adjusted so that the measurement results approach the corresponding intended discharge characteristics. A method for this adjustment is analogous to that in step S6. This adjustment is actually reflected in the waveform candidate information D1 when it is determined in step S11 described below that the process is to return to step S2.

In step S11, the processing unit 441 determines whether or not the processing is to be ended. This determination is made based on whether or not the measurement results obtained in step S8 fall in predetermined ranges relative to the corresponding target values. When the measurement results do not fall in the predetermined ranges relative to the corresponding target values, the process returns to step S2 described above. On the other hand, when the measurement results fall in the predetermined ranges relative to the corresponding target values, the processing unit 441 designates a waveform based on most-recently set waveform candidate information as the waveform of the drive pulse PD and then ends the processing.

Although a method for determining the waveform of the drive pulse PD by using both the simulation and the actual measurement has been described in the present embodiment, the present disclosure is not limited thereto. Even with a method for determining the waveform of the drive pulse PD by performing only the actual measurement or only the simulation, an advantage that is analogous to that of the present embodiment can be obtained, as long as such a method uses the waveform information D2.

The drive-waveform determination system 10 described above includes the first liquid discharging head 210_1, the second liquid discharging head 210_2, and the processing circuit 440. Each of the first liquid discharging head 210_1 and the second liquid discharging head 210_2 has the plurality of piezoelectric elements 211, which is one example of drive elements for discharging ink, which is one example of liquid. The processing circuit 440 performs processing for determining the waveform of the first drive pulse PD_1 to be applied to the piezoelectric element 211 provided in the first liquid discharging head 210_1.

As described above, the processing circuit 440 executes step S103, which is one example of the "first step", and step S104, which is one example of the "second step". In step S103, the second waveform information D2_2 regarding the waveform of the second drive pulse PD_2 applied to the piezoelectric elements 211 provided in the second liquid discharging head 210_2 is obtained. In step S104, the waveform of the first drive pulse PD_1 is determined based on the second waveform information D2_2. The processing circuit 440 executes the drive-waveform determination method, which includes steps S103 and S104, as described above.

In the drive-waveform determination method described above, since the second waveform information D2_2 regarding the waveform of the second drive pulse PD_2 is used to determine the waveform of the first drive pulse PD_1, the waveform of the first drive pulse PD_1 can be determined without using the waveform information D2 generated using the first liquid discharging head 210_1. Thus, compared with a method that does not use the second waveform information D2_2, it is possible to reduce the number of processing steps needed to determine the waveform of the first drive pulse PD_1.

In the present embodiment, in step S104, the waveform of the first drive pulse PD_1 is determined based on the waveform candidate information D1 indicating one or more waveform candidates of the first drive pulse PD_1 and the second waveform information D2_2, as described above. Thus, it is possible to determine the waveform of the first drive pulse PD_1 according to the target values of the discharge characteristics of the ink from the first liquid discharging head 210_1.

It is preferable that the second waveform information D2_2 include information indicating waveform non-candidates of the second drive pulse PD_2, the waveform non-candidates not being the waveform candidates of the second drive pulse PD_2. The information indicates that the waveform non-candidates of the second drive pulse PD_2 are not worth being evaluated as the waveform of the first drive pulse PD_1. Thus, based on the information, the waveform of the first drive pulse PD_1 can be determined without evaluating each waveform candidate that is included in one or more waveform candidates indicated by the waveform candidate information D1 and that corresponds to any of the waveform non-candidates. As a result, it is possible to reduce the number of processing steps to determine the waveform of the first drive pulse PD_1.

As described above, in step S104, the waveform of the first drive pulse PD_1 is determined using the information obtained by excluding each waveform candidate that is included in the one or more waveform candidates and that corresponds to any of the waveform non-candidates, thereby reducing the number of processing steps needed to determine the waveform of the first drive pulse PD_1.

The drive-waveform determination method in the present embodiment further includes step S102, which is one example of the "fifth step", and step S104 is performed by the first processing unit 441_1. In step S102, the second waveform information D2_2 is transmitted from the second processing unit 441_2 provided corresponding to the second liquid discharging head 210_2 to the first processing unit 441_1 provided corresponding to the first liquid discharging head 210_1. Thus, in the drive-waveform determination system 10 that uses the P2P system as a communication system, as in the present embodiment, the first processing unit 441_1 can determine the waveform of the first drive pulse PD_1.

Also, the drive-waveform determination method in the present embodiment further includes step S112, which is one example of the "eighth step". In step S112, the waveform of the third drive pulse PD_3 to be applied to the piezoelectric elements 211 provided in the third liquid discharging head 210_3 that discharges ink is determined based on the first waveform information D2_1 regarding the waveform of the first drive pulse PD_1 and the second waveform information D2_2. Thus, it is possible to determine the waveform of the drive pulse PD while three printing systems 100 share the waveform information D2. The printing system 100_4 can also determine the waveform of the drive pulse PD, as in the printing system 100_1, 100_2, or 100_3. Also, although an example of the case in which the number of printing systems 100 is four has been described in the present embodiment, the number of printing systems 100 may be five or more, in which case, the waveform of the drive pulse PD can also be determined as in the printing system 100_1, 100_2, or 100_3.

In addition, as described above, the drive-waveform determination method in the present embodiment further includes step S109, which is one example of a "ninth step". In step S109, the waveform of the second drive pulse PD_2 is re-determined based on the first waveform information D2_1 regarding the waveform of the first drive pulse PD_1. Thus, it is possible to further optimize the waveform of the second drive pulse PD_2.

As described above, the first liquid discharging head 210_1 and the second liquid discharging head 210_2 are provided in the liquid discharging apparatuses 200 that are different from each other. In this case, it is difficult for the first liquid discharging head 210_1 and the second liquid discharging head 210_2 to share the drive pulse PD. Thus, determining the waveform of the first drive pulse PD_1 based on the second waveform information D2_2 is useful in a case in which the first liquid discharging head 210_1 and the second liquid discharging head 210_2 are provided in the liquid discharging apparatuses 200 that are different from each other.

It is preferable that the first processing unit 441_1 provided corresponding to the first liquid discharging head 210_1 and the second processing unit 441_2 provided corresponding to the second liquid discharging head 210_2 be connected to each other through wireless communication. In this case, compared with a case in which a wired connection is used, there is an advantage that the printing systems 100_1 and 100_2 can be easily installed.

2. Second Embodiment

Figure 7:
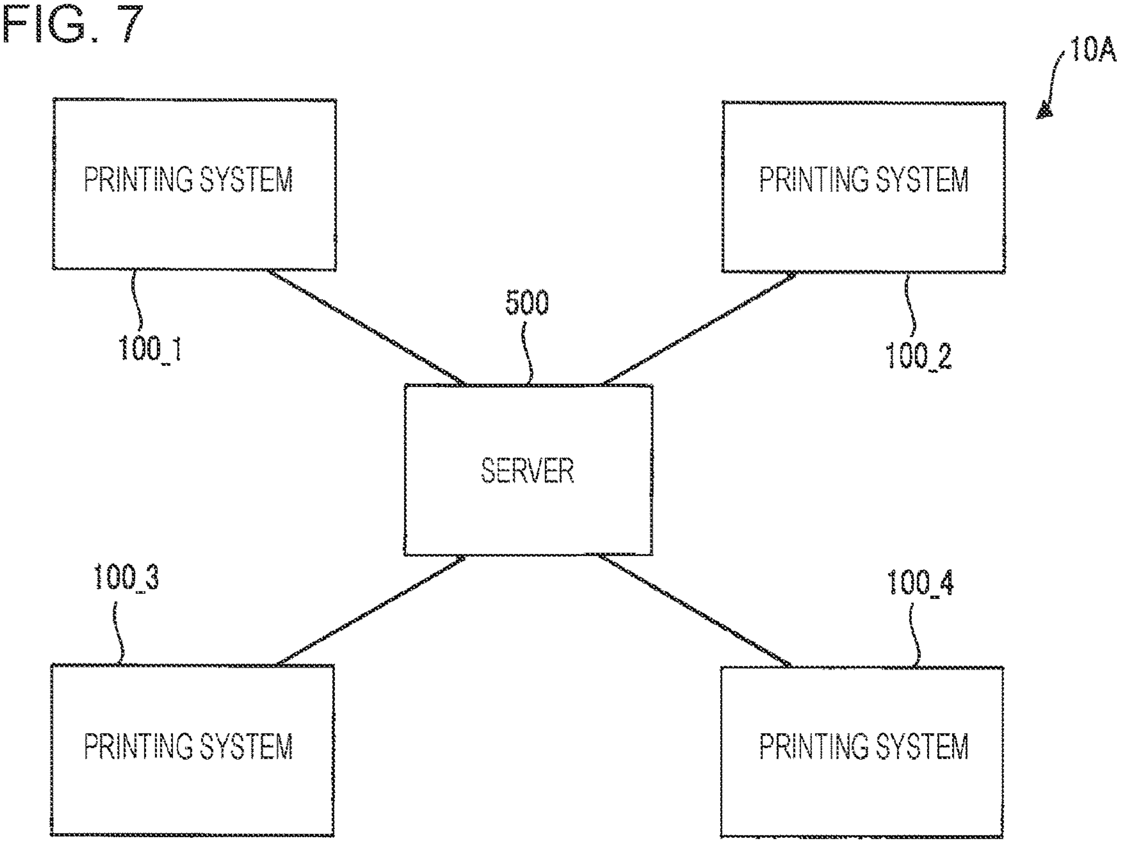
FIG. 7 is a schematic diagram illustrating a configuration example of a drive-waveform determination system according to a second embodiment.

FIG. 7 is a schematic diagram illustrating a configuration example of a drive-waveform determination system 10A according to a second embodiment. The drive-waveform determination system 10A includes printing systems 100_1, 100_2, 100_3, and 100_4 and a server 500. The drive-waveform determination system 10A is a system employing a server client system, and each of the printing systems 100_1, 100_2, 100_3, and 100_4 is connected to the server 500 to be able to communicate therewith. In this connection, a communication network including the Internet or the like may be involved.

In the present embodiment, the server 500 stores therein the waveform information D2 from each printing system 100, and each printing system 100 obtains the waveform information D2, transmitted from another printing system 100, from the server 500. That is, the printing systems 100_1, 100_2, 100_3, and 100_4 can mutually share information via the server 500, the information being needed to determine the waveform of a drive pulse.

Figure 8:
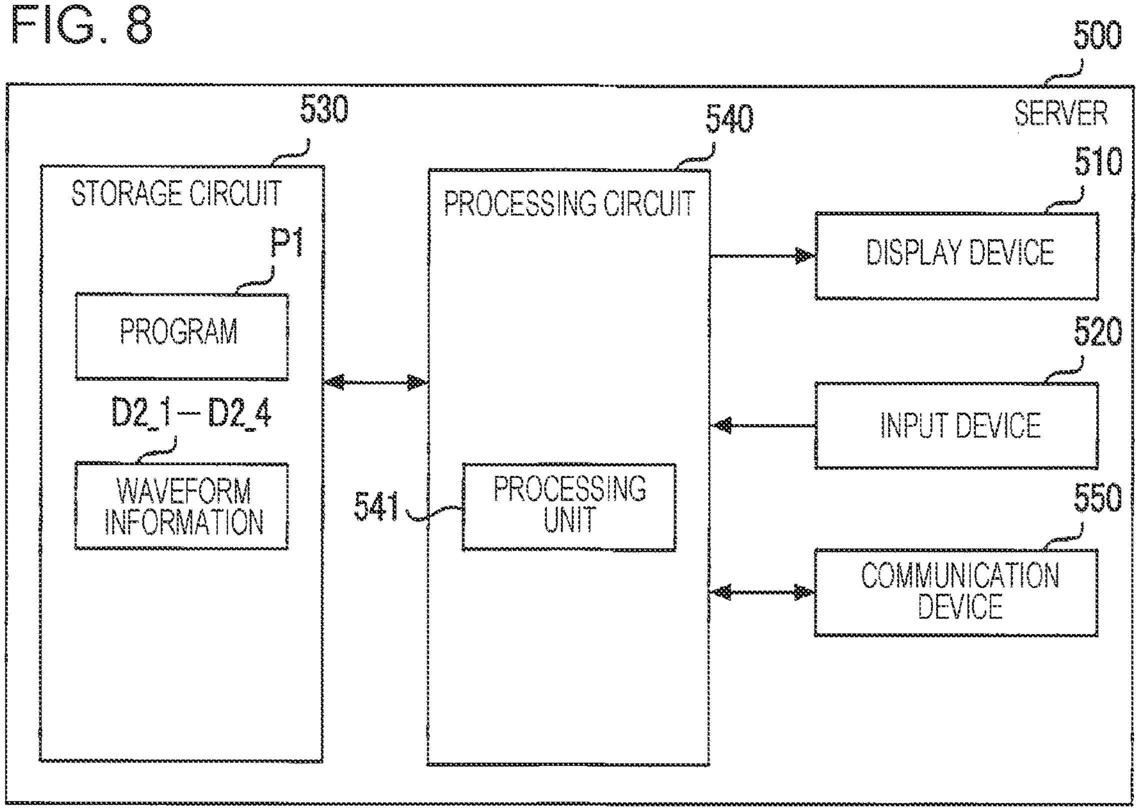
FIG. 8 is a schematic diagram illustrating a configuration example of a server used in the drive-waveform determination system according to the second embodiment.

FIG. 8 is a schematic diagram illustrating a configuration example of the server 500 used in the drive-waveform determination system 10A according to the second embodiment. The server 500 is a computer that obtains the waveform information D2 from each printing system 100 and provides the waveform information D2 thereto.

As illustrated in FIG. 8, the server 500 includes a display device 510, an input device 520, a storage circuit 530, a processing circuit 540, and a communication device 550. These devices and circuits are connected to be able to communicate with each other.

The display device 510 is a device that displays various images under the control of the processing circuit 540 and is configured similarly to the display device 410. The input device 520 is equipment that receives an operation from the user and is configured similarly to the input device 420 described above. The communication device 550 is an interface that is connected to each printing system 100 to be able to communicate therewith and is configured similarly to the communication device 450. The communication device 550 may be regarded as a portion of a processing unit 541 described below or may be integral with the processing circuit 540.

The storage circuit 530 is a device that stores therein various programs to be executed by the processing circuit 540 and various types of data processed by the processing circuit 540. The storage circuit 530 is configured similarly to the storage circuit 430 described above. The storage circuit 530 stores therein a program P1 and pieces of waveform information D2 (D2_1 to D2_4).

The processing circuit 540 is a device having a function for controlling the individual portions in the server 500 and a function for processing various types of data and is configured similarly to the processing circuit 440 described above. The processing circuit 540 functions as the processing unit 541 by reading the program P1 from the storage circuit 530 and executing the read program P1.

The processing unit 541 has a function for obtaining the waveform information D2 from each printing system 100 and causing the obtained waveform information D2 to be stored in the storage circuit 530 and a function for causing the waveform information D2 stored in the storage circuit 530 to be transmitted to the communication device 550 in response to a request from each printing system 100. By using those functions, the server 500 accumulates the pieces of waveform information D2 from the printing systems 100_1, 100_2, 100_3, and 100_4 and collectively manages the pieces of waveform information D2.

Figure 9:
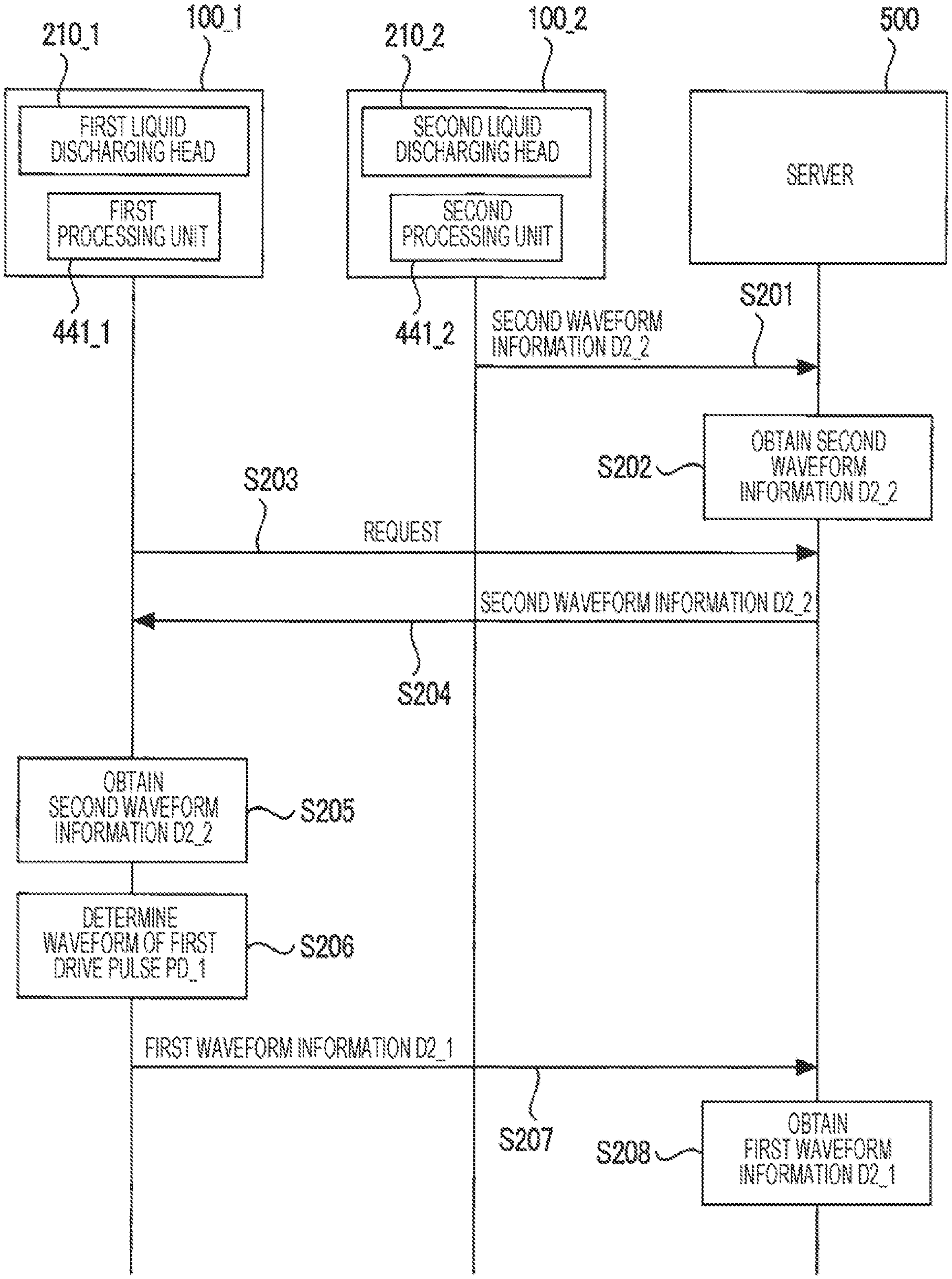
FIG. 9 is a flowchart illustrating a drive-waveform determination method according to the second embodiment.

FIG. 9 is a flowchart illustrating a drive-waveform determination method according to the second embodiment. FIG. 9 illustrates flows of processes between the printing systems 100_1 and 100_2 and the server 500 when the printing system 100_1 determines the waveform of the drive pulse PD. Although the printing systems 100_3 and 100_4 are not illustrated in FIG. 9, processes in the printing system 100_3 or 100_4 are substantially the same as processes in the printing system 100_1 or 100_2.

A case in which the printing system 100_2 has second waveform information D2_2, which is generated as the waveform information D2 upon determining the waveform of the drive pulse PD in advance, will be described by way of example. Although a detailed description is not given, when the printing system 100_2 does not have the second waveform information D2_2, the printing system 100_1 determines the waveform of the drive pulse PD by using the waveform information D2 obtained from another printing system via the server 500 or without using the waveform information D2.

First, as illustrated in FIG. 9, in step S201, the second processing unit 441_2 transmits the second waveform information D2_2 to the server 500 as the waveform information D2. This transmission is performed via the communication device 450 in the printing system 100_2. Step S201 is one example of a "third step". This transmission may be performed when a request is received from the server 500.

Thereafter, in step S202, the server 500 obtains the second waveform information D2_2. This obtaining is performed via the communication device 550 in the server 500. After the obtaining, the server 500 causes the second waveform information D2_2 to be stored in the storage circuit 530.

Thereafter, when the printing system 100_1 receives an instruction for determining the waveform of the drive pulse PD from the user or the like, the first processing unit 441_1 issues a request for the waveform information D2 to the server 500 in step S203.

Next, in step S204, the server 500 transmits the second waveform information D2_2 to the printing system 100_1 as the waveform information D2. This transmission is performed via the communication device 550. Step S204 is one example of a "fourth step".

Thereafter, in step S205, the first processing unit 441_1 obtains the second waveform information D2_2, as in step S103 in the first embodiment described above. Step S205 is one example of the "first step".

Next, in step S206, the first processing unit 441_1 determines the waveform of the first drive pulse PD_1, which is the drive pulse PD used in the printing system 100_1, based on the second waveform information D2_2, as in step S104 in the first embodiment described above. Step S206 is one example of the "second step".

Thereafter, in step S207, the first processing unit 441_1 transmits the first waveform information D2_1 to the server 500. This transmission is performed via the communication device 450 in the printing system 100_1. This transmission may be performed when a request is received from the server 500.

In the second embodiment, the number of processes needed to determine the waveform of the first drive pulse PD_1 can also be reduced, as in the first embodiment described above. As described above, the drive-waveform determination method in the present embodiment further includes step S201, which is one example of the "third step", and step S204, which is one example of the "fourth step", and step S206 in which the waveform of the first drive pulse PD_1 is determined is performed by the first processing unit 441_1. In this case, in step S201, the second waveform information D2_2 is transmitted from the second processing unit 441_2 provided corresponding to the second liquid discharging head 210_2 to the server 500. In step S204, at least part of the second waveform information D2_2 is transmitted from the server 500 to the first processing unit 441_1 provided corresponding to the first liquid discharging head 210_1. Thus, in the drive-waveform determination system 10A that uses the server client system as a communication system, as in the present embodiment, the first processing unit 441_1 can determine the waveform of the first drive pulse PD_1.

Although the drive-waveform determination system 10A in the present embodiment includes the server 500 separately from the printing systems 100_1 to 100_4, any of the printing systems 100_1 to 100_4 may have functions that are similar to those of the server 500.

3. Third Embodiment

Figure 10:
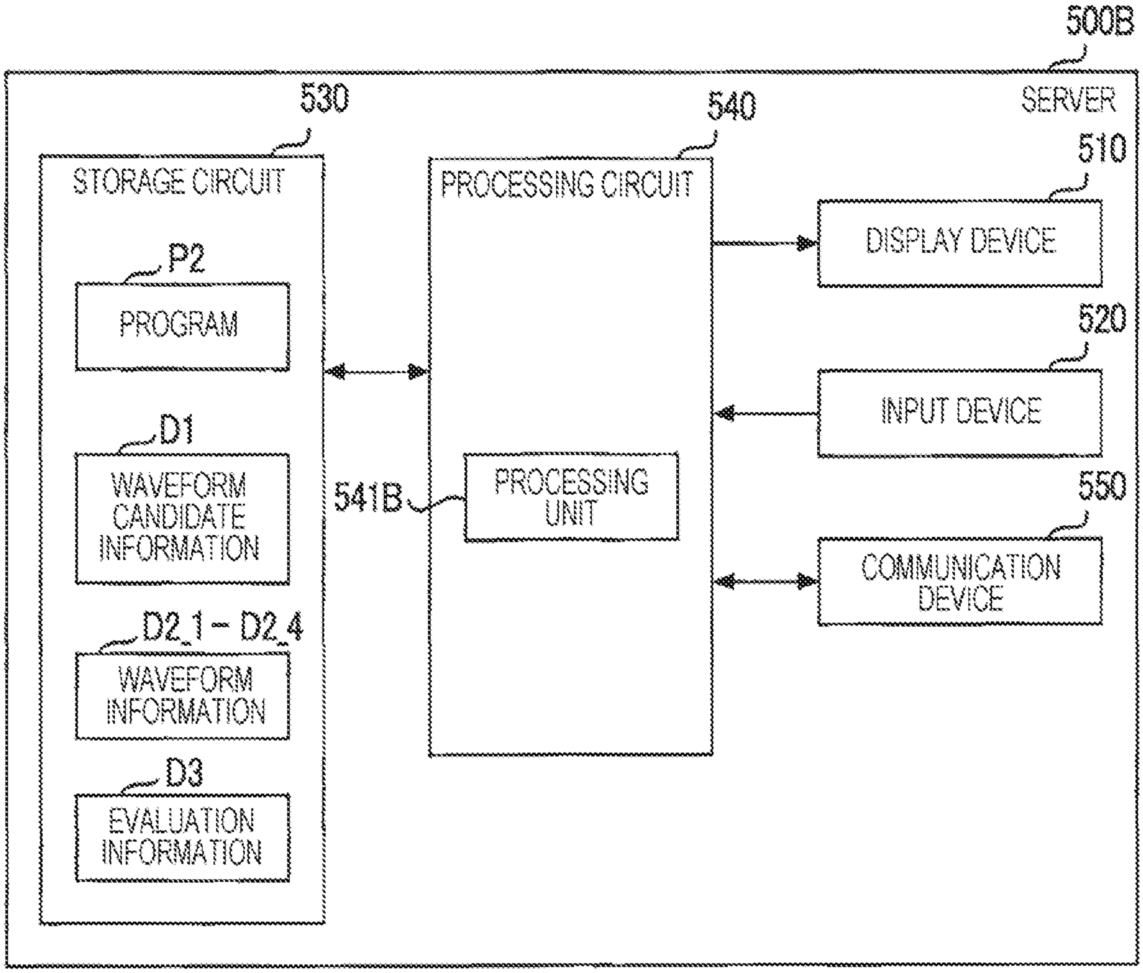
FIG. 10 is a schematic diagram illustrating a configuration example of a server used in a drive-waveform determination system according to a third embodiment.

FIG. 10 is a schematic diagram illustrating a configuration example of a server 500B used in a drive-waveform determination system according to a third embodiment. The server 500B is substantially the same as the server 500 in the second embodiment described above, except that a program P2 is used instead of the program P1. The processing circuit 540 functions as a processing unit 541B by reading the program P2 from the storage circuit 530 and executing the read program P2.

The processing unit 541B has a function for obtaining the waveform information D2 from each printing system 100 and causing the obtained waveform information D2 to be stored in the storage circuit 530 and a function for determining the waveform of the drive pulse PD based on the waveform information D2 stored in the storage circuit 530 in response to a request from each printing system 100 and causing the waveform information D2 regarding the determination to be transmitted to the communication device 550. By using those functions, the server 500B provides the printing systems 100_1, 100_2, 100_3, and 100_4 with a service for determining the waveform of the drive pulse PD.

The processing unit 541B further has a function for receiving information regarding evaluation, such as a review from the user, with respect to ink discharge characteristics using the drive pulse PD, ink, or the head. This function is realized, for example, by causing the display device 510 to perform display for the user to input the evaluation and receiving the user's input using the input device 520.

Figure 11:
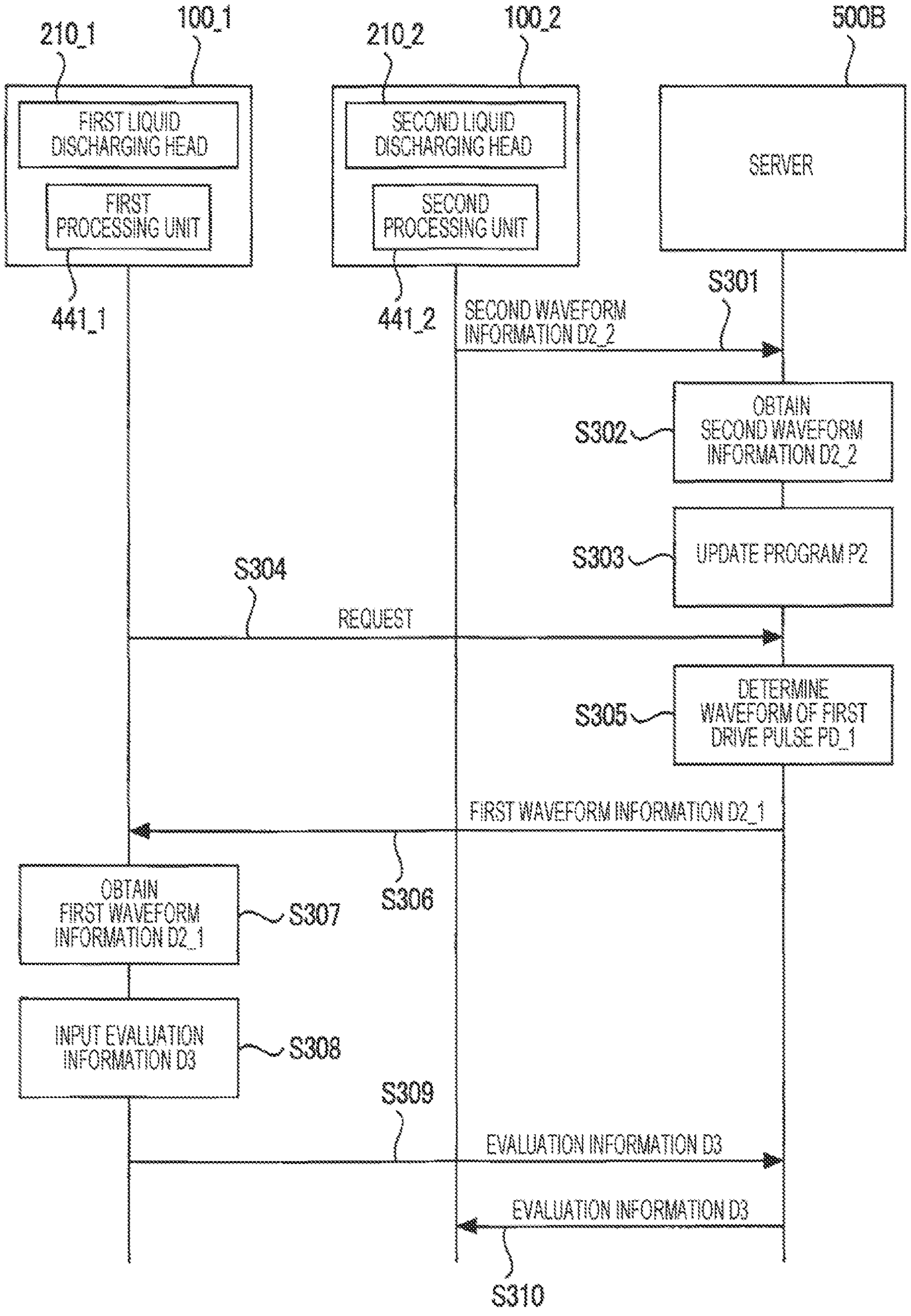
FIG. 11 is a flowchart illustrating a drive-waveform determination method according to the third embodiment.

FIG. 11 is a flowchart illustrating a drive-waveform determination method according to the third embodiment. FIG. 11 illustrates flows of processes between the printing systems 100_1 and 100_2 and the server 500B when the waveform of the first drive pulse PD_1 used in the printing system 100_1 is determined. Although the printing systems 100_3 and 100_4 are not illustrated in FIG. 11, processes in the printing system 100_3 or 100_4 are substantially the same as processes in the printing system 100_1 or 100_2.

A case in which the printing system 100_2 has second waveform information D2_2, which is generated as the waveform information D2 upon determining the waveform of the drive pulse PD in advance, will be described by way of example. Although a detailed description is not given, when the printing system 100_2 does not have the second waveform information D2_2, the server 500B determines the waveform of the drive pulse PD by obtaining the waveform information D2 from another printing system or without using the waveform information D2.

First, as illustrated in FIG. 11, in step S301, the second processing unit 441_2 transmits the second waveform information D2_2 to the server 500B as the waveform information D2, as in step S201 in the second embodiment described above. Step S301 is one example of the "third step". This transmission may also be performed when a request is received from the server 500B.

Thereafter, in step S302, the server 500B obtains the second waveform information D2_2, as in step S202 in the second embodiment described above.

Next, in step S303, the server 500B updates the program P2. For example, when the type of ink, the configuration of the head, or the like is changed, the update in step S303 has information modified according to the change. The timing of executing step S303 is not limited to the example illustrated in FIG. 11. Step S303 may be executed as needed or may be omitted.

Thereafter, when the printing system 100_1 receives an instruction for determining the waveform of the drive pulse PD from the user or the like, the first processing unit 441_1 issues a request for determining the waveform of the drive pulse PD to the server 500 in step S304.

Next, in step S305, the server 500B determines the waveform of the first drive pulse PD_1, which is the drive pulse PD used in the printing system 100_1, based on the second waveform information D2_2, as in step S104 in the first embodiment described above. Step S305 is one example of the "second step".

In step S306, the server 500B transmits the first waveform information D2_1 to the printing system 100_1 as the waveform information D2. This transmission is performed via the communication device 550. Step S306 is one example of a "sixth step".

Thereafter, in step S307, the first processing unit 441_1 obtains the first waveform information D2_1. By obtaining the first waveform information D2_1, the first processing unit 441_1 can generate the waveform of the first drive pulse PD_1, based on the first waveform information D2_1.

Next, in step S308, the first processing unit 441_1 receives an input of evaluation information D3. When the input is received, the first processing unit 441_1 transmits the evaluation information D3 to the server 500B in step S309. The evaluation information D3 transmitted to the server 500B is stored in the storage circuit 530 in the server 500B. Thereafter, for example, upon receiving a request from the printing system 100_2, the server 500B transmits the evaluation information D3 to the printing system 100_2 in step S310, as needed.

In the third embodiment described above, the number of processing steps needed to determine the waveform of the first drive pulse PD_1 can also be reduced, as in the first embodiment described above. The drive-waveform determination method in the present embodiment further includes step S301, which is one example of the "third step", and step S306, which is one example of the "sixth step", and step S305 in which the waveform of the first drive pulse PD_1 is determined is performed by the server 500B. In this case, in step S301, the second waveform information D2_2 is transmitted from the second processing unit 441_2 provided corresponding to the second liquid discharging head 210_2 to the server 500B. In step S306, the first waveform information D2_1 regarding the waveform of the first drive pulse PD_1 is transmitted from the server 500B to the first processing unit 441_1 provided corresponding to the first liquid discharging head 210_1. Thus, in a drive-waveform determination system 10B that uses a server client system as a communication system, as in the present embodiment, the server 500B can determine the waveform of the first drive pulse PD_1.

Also, the drive-waveform determination method in the present embodiment further includes step S303, which is one example of a "seventh step". In step S303, the program P2 stored in the storage circuit 530, which is one example of a "storage unit" provided corresponding to the second liquid discharging head 210_2, is updated. The program P2 causes the server 500B to realize a function for determining the waveform of the first drive pulse PD_1. Since an update as described above is performed, services corresponding to a new ink or the structure of a new head can be provided at a time to the printing systems 100, which are clients.

4. Fourth Embodiment

Figure 12:
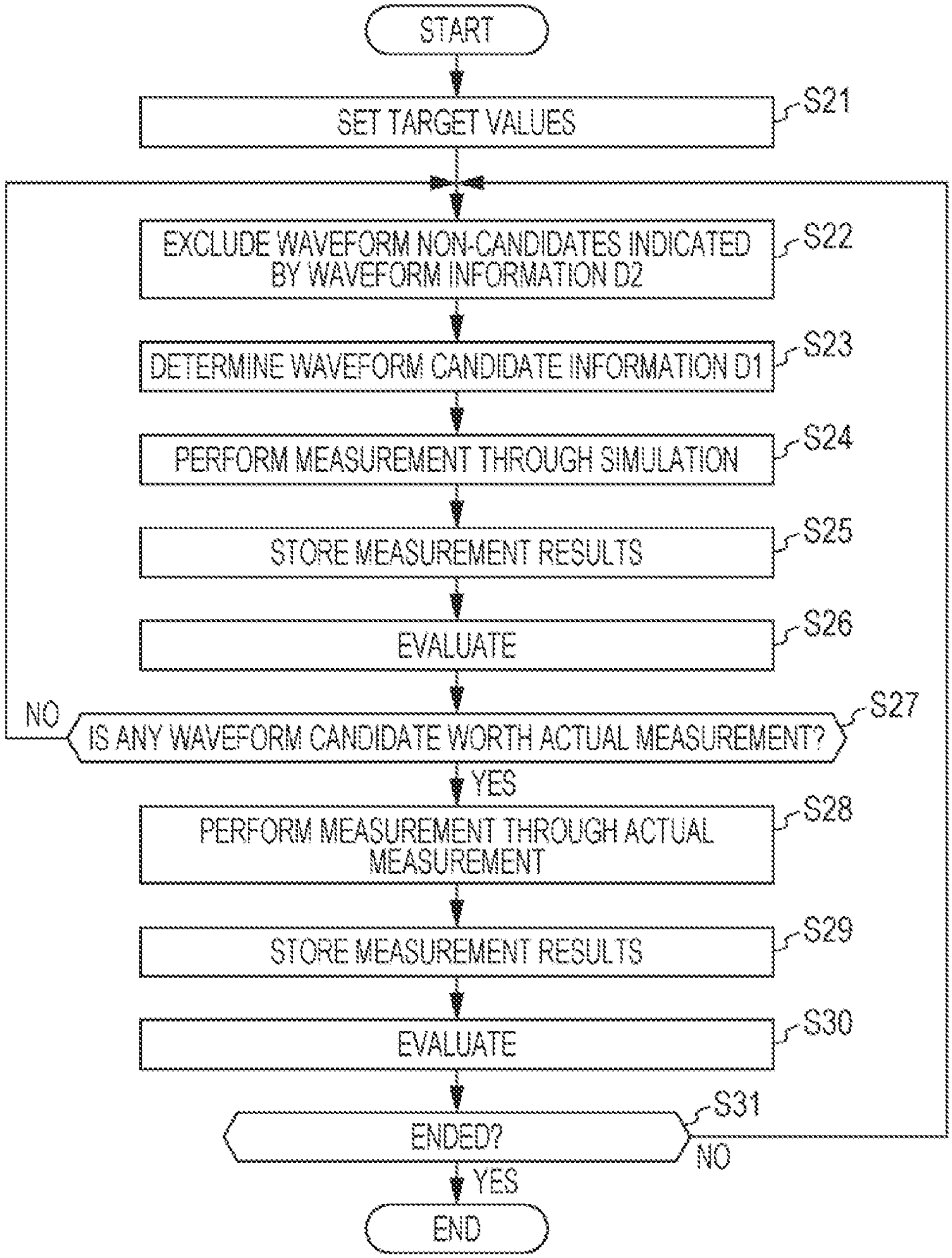
FIG. 12 is a flowchart illustrating one example of processing for automatically determining the waveform of the drive pulse.

In a fourth embodiment, the waveform of the drive pulse PD is determined using a method that is different from the method in the flowchart in FIG. 6 in the first to third embodiments. FIG. 12 is a flowchart illustrating one example of processing for automatically determining the waveform of the drive pulse PD in step S104 in the fourth embodiment. Processes other than the processes in this flowchart in FIG. 12 are analogous to those in the first to the third embodiment. Since steps S21 and S24 to S31 in the fourth embodiment are substantially the same as steps S1 and S4 to S11 in the first to third embodiments, descriptions thereof are not given hereinafter.

In the fourth embodiment, after target values or an evaluation value are/is set in step S21, waveform candidates indicated by the waveform information D2 are obtained in step S22. That is, for determining the drive waveform of one target printing system 100, drive waveform candidates that were used when another printing system 100 determined the waveform of the drive pulse PD are obtained.

In step S22, the waveform information D2 is used to determine the waveform candidate information D1.

For example, when Bayesian optimization is used, not only waveform candidates in one target printing system 100 but also waveform candidates used to determine the waveform of the drive pulse PD in another printing system 100 (i.e., waveform candidates of the second drive pulse PD_2) are used to search for the parameters p1, p2, p3, . . . in accordance with an acquisition function. In this case, waveform non-candidates in another printing system 100 may be further used. In step S22 performed immediately after step S21, only the waveform information D2 in another printing system 100 is used to determine the waveform candidate information D1, and in step S22 performed after step S27, the waveform information D2 in the other printing system 100 and the waveform candidate information D1 in the target printing system 100, the waveform candidate information D1 being obtained by then, are used to determine next waveform candidate information D1.

Also, when the Nelder-Mead method is used, waveform information D2 at at least some of search points are set for the waveform information D2 in the other printing system 100 to search for the parameters p1, p2, p3, . . . . In particular, in an initial stage of the searching, such as a search start point, using the waveform information D2 is particularly effective. In this case, although waveform non-candidates in the other printing system 100 may also be used, it is more preferable that waveform candidates (waveform candidates of the second drive pulse PD_2) be used. When step S23 is performed after step S27, that is, when the search has been performed to some degree, search points may be partly replaced based on the evaluation value obtained in step S26 performed previously.

As described above, although, in the first to third embodiments, the waveform information D2 is used to exclude unfavorable waveforms from the waveform candidate information D1, the waveform information D2 is used to determine the waveform candidate information D1 in the fourth embodiment. In this case, it is also possible to reduce the number of processing steps needed to determine the waveform of the first drive pulse PD_1. The waveform information D2 may be used to exclude the waveform candidate information D1, as in the first to third embodiments, and the waveform information D2 may be used to determine the waveform candidate information D1, as in the fourth embodiment.

In the present embodiment, when information indicating the discharge characteristics, such as the amount of ink and a discharge speed measured in a process of determining the waveform of the second drive pulse PD_2, in addition to the information indicating the waveform candidates and the waveform non-candidates of the second drive pulse PD_2 is used as the waveform information D2, it is possible to more preferably determine the waveform candidate information D1.

5. Fifth Embodiment

Figure 13:
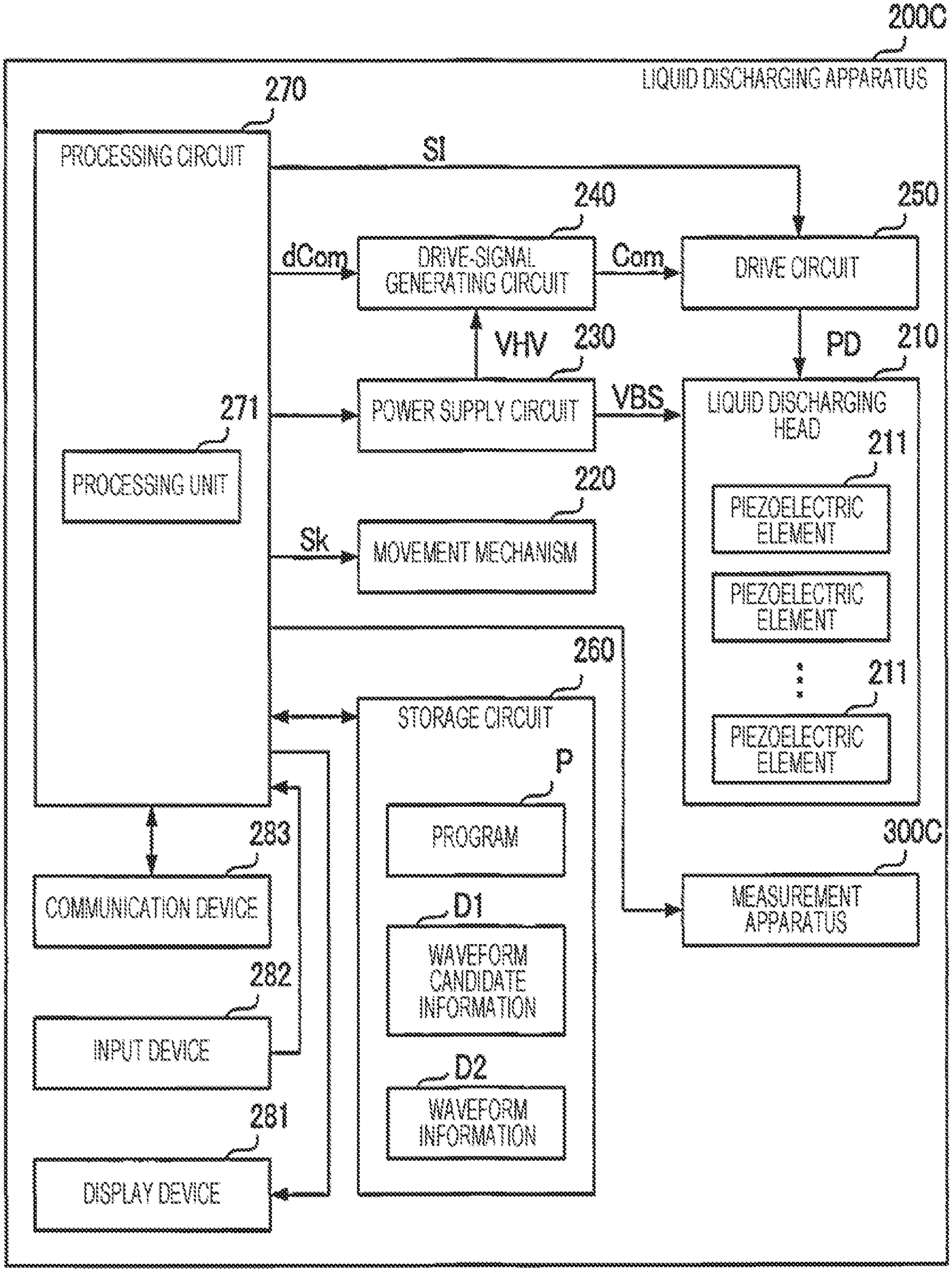
FIG. 13 is a schematic diagram illustrating a configuration example of a liquid discharging apparatus used for a drive-waveform determination method according to a fourth embodiment.

FIG. 13 is a schematic diagram illustrating a configuration example of a liquid discharging apparatus 200C used for a drive-waveform determination method according to a fifth embodiment. The liquid discharging apparatus 200C is substantially the same as the liquid discharging apparatus 200, except that the liquid discharging apparatus 200C includes a display device 281, an input device 282, a communication device 283, and a measurement apparatus 300C, and executes the program P.

The display device 281 is configured similarly to the display device 410 in the first embodiment described above. The input device 282 is configured similarly to the input device 420 in the first embodiment described above. The communication device 283 is configured similarly to the communication device 450 in the first embodiment described above. The measurement apparatus 300C is configured similarly to the measurement apparatus 300 in the first embodiment described above. At least one of the display device 281, the input device 282, and the measurement apparatus 300C may be provided external to the liquid discharging apparatus 200.

The storage circuit 260 in the present embodiment stores therein the program P, the waveform candidate information D1, and the waveform information D2. The processing circuit 270 in the present embodiment is one example of a computer and functions as a processing unit 271 by executing the program P.

When the waveform information D2 is obtained, the processing unit 271 determines the waveform of the drive pulse PD by using the waveform candidate information D1 and the waveform information D2, as in the processing unit 441 in the first embodiment described above.

In the fifth embodiment described above, the number of processes needed to determine the waveform of the first drive pulse PD_1 can also be reduced, as in the first embodiment described above.

Although a case in which the liquid discharging apparatus 200C has a configuration and functions that are analogous to those in the first embodiment has been described in the present embodiment, the liquid discharging apparatus 200C may have a configuration and functions that are analogous to those in the second, third, or fourth embodiment.

6. Modifications

Although the drive-waveform determination method, the drive-waveform determination program, the liquid discharging apparatus, and the drive-waveform determination system in the present disclosure have been described based on the illustrated embodiments, the present disclosure is not limited thereto. The configurations of the individual portions in the present disclosure can be replaced with arbitrary configurations that realize functions that are substantially the same as those in the above-described embodiments, and an arbitrary configuration can also be added to those configurations.

6-1. First Modification

Although the configuration in which the program P is executed by the processing circuit provided in the apparatus including the storage circuit to which the program P is installed has been described in the above-described embodiments by way of example, the present disclosure is not limited thereto, and the program P may also be executed by a processing circuit provided in an apparatus that is different from the apparatus including the storage circuit to which the program P is installed. For example, the processing circuit 270 in the liquid discharging apparatus 200 may execute the program P stored in the storage circuit 430 in the information processing apparatus 400, as in the first embodiment.

6-2. Second Modification

Although, in the above-described embodiments, a configuration using both the actual measurement and the simulation to determine the waveform of the drive pulse PD has been described by way of example, the present disclosure is not limited thereto. For example, one of the actual measurement and the simulation may be omitted. When conditions, such as the target values for discharge characteristics of ink, the type of ink, and the configuration of the head, are the same among the printing systems 100, the waveform of the drive pulse PD may be determined using only the waveform information D2 from another printing system 100 without using both the actual measurement and the simulation.

6-3. Third Modification

Although a configuration in which the waveform of the drive pulse PD is automatically determined has been described in the above embodiments by way of example, the present disclosure is not limited thereto, and at least part of the processing for the determination may be manually performed. For example, the information indicated by the waveform information D2 from another printing system 100 may be displayed on the display device 410, and by using the displayed information as a clue, the user may manually determine the waveform of the drive pulse PD by using the input device 420.

What is claimed is:

1. A drive-waveform determination method for determining a waveform of a first drive pulse to be applied to a drive element included in a first liquid discharging head that discharges liquid, the drive-waveform determination method comprising:

a first step of obtaining second waveform information regarding a waveform of a second drive pulse to be applied to a drive element included in a second liquid discharging head that discharges liquid;

a second step of determining the waveform of the first drive pulse, based on the second waveform information; and a third step of transmitting the second waveform information from a second processing unit provided corresponding to the second liquid discharging head to a server.

2. The drive-waveform determination method according to claim 1, wherein in the second step, the waveform of the first drive pulse is determined based on waveform candidate information indicating one or more waveform candidates of the first drive pulse and the second waveform information.

3. The drive-waveform determination method according to claim 2, wherein the second waveform information includes information indicating a waveform non-candidate of the second drive pulse, the waveform non-candidate not being a waveform candidate of the second drive pulse.

4. The drive-waveform determination method according to claim 3, wherein in the second step, the waveform of the first drive pulse is determined using information obtained by excluding a waveform candidate that is included in the one or more waveform candidates of the first drive pulse and that corresponds to the waveform non-candidate of the second drive pulse.

5. The drive-waveform determination method according to claim 2, wherein the second waveform information includes information indicating one or more waveform candidates of the second drive pulse.

6. The drive-waveform determination method according to claim 5, wherein the second waveform information includes information indicating a discharge characteristic measured in a process of determining the second drive pulse.

7. The drive-waveform determination method according to claim 5, wherein, in the second step, the one or more waveform candidates of the first drive pulse are determined using the information indicating the one or more waveform candidates of the second drive pulse.

8. The drive-waveform determination method according to claim 1, further comprising:

a fourth step of transmitting at least part of the second waveform information from the server to a first processing unit provided corresponding to the first liquid discharging head, wherein the second step is performed by the first processing unit.

9. The drive-waveform determination method according to claim 1, further comprising:

a sixth step of transmitting first waveform information regarding the waveform of the first drive pulse from a first processing unit provided corresponding to the first liquid discharging head to the server, wherein the second step is performed by the server.

10. The drive-waveform determination method according to claim 9, further comprising:

a seventh step of updating a program stored in a storage unit provided in the server, wherein the program causes the server to implement a function for determining the waveform of the first drive pulse.

11. The drive-waveform determination method according to claim 1, further comprising:

an eighth step of determining a waveform of a third drive pulse to be applied to a drive element included in a third liquid discharging head that discharges liquid, based on first waveform information regarding the waveform of the first drive pulse and the second waveform information.

12. The drive-waveform determination method according to claim 1, further comprising:

a ninth step of re-determining the waveform of the second drive pulse, based on first waveform information regarding the waveform of the first drive pulse.

13. The drive-waveform determination method according to claim 1, wherein the first liquid discharging head and the second liquid discharging head are provided in liquid discharging apparatuses that are different from each other.

14. The drive-waveform determination method according to claim 1, wherein a first processing unit provided corresponding to the first liquid discharging head and a second processing unit provided corresponding to the second liquid discharging head are connected to each other through wireless communication.

15. A non-transitory computer-readable storage medium storing a drive-waveform determination program, the program causing a computer to execute the drive-waveform determination method according to claim 1.

16. A drive-waveform determination system comprising:

a first liquid discharging head including a drive element for discharging liquid;

a second liquid discharging head including a drive element for discharging liquid; and a processing circuit that performs processing for determining a waveform of a first drive pulse to be applied to a drive element included in the first liquid discharging head, wherein the processing circuit executes:

a first step of obtaining second waveform information regarding a waveform of a second drive pulse to be applied to a drive element included in a second liquid discharging head that discharges liquid;

a second step of determining the waveform of the first drive pulse, based on the second waveform information.

17. A drive-waveform determination method for determining a waveform of a first drive pulse to be applied to a drive element included in a first liquid discharging head that discharges liquid, the drive-waveform determination method comprising:

a first step of obtaining second waveform information regarding a waveform of a second drive pulse to be applied to a drive element included in a second liquid discharging head that discharges liquid;

a second step of determining the waveform of the first drive pulse, based on the second waveform information; and a third step of re-determining the waveform of the second drive pulse, based on first waveform information regarding the waveform of the first drive pulse.

18. The drive-waveform determination method according to claim 17, wherein in the second step, the waveform of the first drive pulse is determined based on waveform candidate information indicating one or more waveform candidates of the first drive pulse and the second waveform information.

19. The drive-waveform determination method according to claim 17, further comprising:

a fourth step of transmitting at least part of the second waveform information from the server to a first processing unit provided corresponding to the first liquid discharging head, wherein the second step is performed by the first processing unit.

20. The drive-waveform determination method according to claim 17, wherein a first processing unit provided corresponding to the first liquid discharging head and a second processing unit provided corresponding to the second liquid discharging head are connected to each other through wireless communication.

* * * * *